US011271669B2

(12) United States Patent
Campos et al.

(10) Patent No.: US 11,271,669 B2
(45) Date of Patent: Mar. 8, 2022

(54) EDGE-WAVELENGTH-SWITCHING SYSTEM, ASSOCIATED OPTICAL NETWORK, AND FAILOVER RECOVERY METHOD THEREOF

(71) Applicant: CABLE TELEVISION LABORATORIES, INC., Louisville, CO (US)

(72) Inventors: Luis Alberto Campos, Superior, CO (US); Jing Wang, Broomfield, CO (US); Zhensheng Jia, Superior, CO (US); Jim Campanell, Louisville, CO (US); Carmela Stuart, Broomfield, CO (US); Haipeng Zhang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/667,401

(22) Filed: Oct. 29, 2019

(65) Prior Publication Data
US 2020/0136742 A1 Apr. 30, 2020

Related U.S. Application Data

(60) Provisional application No. 62/751,825, filed on Oct. 29, 2018.

(51) Int. Cl.
*H04Q 11/00* (2006.01)
*H04J 14/02* (2006.01)
(Continued)

(52) U.S. Cl.
CPC .......... *H04J 14/0212* (2013.01); *H04B 10/03* (2013.01); *H04B 10/07953* (2013.01);
(Continued)

(58) Field of Classification Search
CPC .................... H04Q 2011/0009; H04J 14/0212
See application file for complete search history.

(56) References Cited

U.S. PATENT DOCUMENTS

2004/0258351 A1* 12/2004 Ducellier ........... G02B 6/29313
385/24
2016/0173225 A1* 6/2016 Cavaliere ............ H04B 10/032
398/7

(Continued)

OTHER PUBLICATIONS

C. K. Chan, "Advanced Optical Performance Monitoring for Next Generation Access Networks," OECC, 2013.
(Continued)

*Primary Examiner* — Nathan M Cors
(74) *Attorney, Agent, or Firm* — Lathrop GPM LLP

(57) ABSTRACT

An edge wavelength-switching system includes an optical switch and a wavelength selective switch. The optical switch includes a west hub-side port, an east hub-side port, a west local-side port, and an east local-side port. The wavelength selective switch includes (i) a multiplexed port optically coupled to the west local-side port and (ii) a bypass port optically coupled to the east local-side port, and (iii) a plurality of demultiplexed ports. An optical network includes a network hub including an M-by-$N_1$ wavelength-selective switch, $N_1 > M \geq 1$, a first network node, and a second network node. Each of the first and second network nodes includes a respective edge wavelength-switching system. The network hub, the first network node, and the second network node are optically coupled.

9 Claims, 25 Drawing Sheets

(51) Int. Cl.
*H04B 10/03* (2013.01)
*H04B 10/079* (2013.01)
*H04B 10/25* (2013.01)

(52) U.S. Cl.
CPC ... *H04B 10/25891* (2020.05); *H04Q 11/0005* (2013.01); *H04Q 2011/0015* (2013.01); *H04Q 2011/0016* (2013.01); *H04Q 2011/0081* (2013.01)

(56) References Cited

U.S. PATENT DOCUMENTS

2017/0149508 A1* 5/2017 Baehr-Jones ......... G02F 1/3132
2018/0120520 A1* 5/2018 Kelly ................... H04B 10/801

OTHER PUBLICATIONS

Campos, L. Alberto, Ph.D., Jia, Zhensheng (Steve), Ph.D., Woldcott, Larry, "Proactive Network Maintenance Evolution to the Optical Domain in Coherent Optics," SCTE-ISBE Cable-Tec Expo 2018, Oct. 22, 2018.

F. N. Hauske, M. Kuschnerov, B. Spinnier, B. Lankl, "Optical Performance Monitoring in Digital Coherent Receivers," J. Lightw. Technol., vol. 27, No. 16, pp. 3623-3631, Aug. 2009.

L. A. Campos, Z. Jia, T. Liu, "Leveraging deployed fiber resources for the implementation of efficient scalable optical access networks," Sept. SC IE/ISBE Cable-Tec Expo'16, 2016.

R. A. Soriano, F. N. Hauske, N. G. Gonzalez, Z. Zhang, Y. Ye, and I. T. Monroy, "Chromatic Dispersion Estimation in Digital Coherent Receivers," J. Lightw. Technol., vol. 29, No. 11, pp. 1627-1637, Jun. 2011.

Z. Dong, F. N. Khan, Q. Sui, K. Zhong, C. Lu, A. P. T. Lau, "Optical Performance Monitoring: A Review of Current and Future Technologies," J. Lightw. Technol., vol. 34, No. 2, pp. 525-543, Jan. 2016.

Z. Jia, "Impact of Access Environment in Cable's Digital Coherent System—Coexistence and Full Duplex Coherent Optics," SCTE Cable-Tec Expo, 2018.

Z. Jia, L. A. Campos, C. Stengrim, J. Wang, C. Knittle, "Digital Coherent Transmission for ext-Generation Cable Operators' Optical Access Networks," SCTE Cable-Tec Expo, 2017.

* cited by examiner

EDGE-WAVELENGTH-SWITCHING SYSTEM, ASSOCIATED OPTICAL NETWORK, AND FAILOVER RECOVERY METHOD THEREOF

CROSS-REFERENCE TO RELATED APPLICATIONS

This application claims priority to U.S. provisional patent application Ser. No. 62/751,825 filed on Oct. 29, 2018, the disclosure of which is incorporated herein by reference in its entirety.

FIELD OF INVENTION

Embodiments herein pertain to optical networks. More specifically, embodiments herein pertain to implementing redundant optical-fiber connectivity paths at network nodes that serve premise host equipment.

BACKGROUND

FIG. 1 shows a cable optical access network which extends from a network hub to the fiber nodes at the edge of the network. From the hub, cable fiber bundles extend in multiple directions. Every time these fiber bundles bifurcate or as fibers are "peeled off" to serve a fiber node, lower fiber strand cable is continuous along the fiber path. As shown in FIG. 1, these cable fiber bundles follow a path corresponding to a tree and branch topology. From a fiber connectivity perspective, a 500-HHP (households passed) fiber node has been dedicated six to eight fibers that connect directly from hub to node. Most of these hub-to-node distances are less than 40 km. In certain areas, market has led to having some of these fibers repurposed. So instead of relying on six to eight fibers per node, only one or two fibers are available for some nodes.

The shaded portion in FIG. 1 represent a fiber node serving area. This network is shown in more detail in FIG. 2. FIG. 2 shows the optical fiber link that extends from the hub to the optical fiber node which typically serves about 500 households. At the node, the optical signals are converted to RF electrical signals. These RF signals are transmitted over coaxial transmission lines that extend from the fiber node in multiple directions. Fiber nodes of that size typically have four or five cascaded amplifiers between the hub and the furthest subscriber. These node topologies are described as "Node plus 4 actives" or "Node plus 5 actives," or simply N+4 or N+5 for short. An amplifier is the active device that the topology name refers to.

SUMMARY OF THE EMBODIMENTS

In a first aspect, an edge wavelength-switching system includes an optical switch and a wavelength selective switch. The optical switch includes a west hub-side port, an east hub-side port, a west local-side port, and an east local-side port. The wavelength selective switch includes (i) a multiplexed port optically coupled to the west local-side port and (ii) a bypass port optically coupled to the east local-side port, and (iii) a plurality of demultiplexed ports.

In a second aspect, an optical network includes a network hub including an M-by-$N_1$ wavelength-selective switch, $N_1 > M \geq 1$, a first network node, and a second network node. Each of the first and second network nodes includes an edge wavelength-switching system of the first aspect. The network hub, the first network node, and the second network node are optically coupled.

In a third aspect, a failover recovery method for an optical network is disclosed. The method includes determining a bit-error-rate severity from a temporal sequence of bit-error rates generated at premise host equipment optically coupled to a network node, of the optical network, that is optically coupled to a hub of the optical network via first optical-fiber path. The method also includes, when the bit-error-rate severity exceeds a predetermined value, rerouting optical signals transmitted between the premise host equipment and the hub such that the optical signals travel along a second optical-fiber path differing from the first optical-fiber path.

DETAILED DESCRIPTION OF THE EMBODIMENTS

In areas of higher capacity-demand, these nodes have been segmented into several smaller nodes so the average node size has been decreasing. The demand for capacity, in addition to wavelength multiplexing challenges that exist with the traditional transport of RF over optical carriers, analog optics, has led to "Distributed Access Architectures," where fiber reaches much smaller fiber node serving area topologies (N+1 to N+0).

Figure 1:
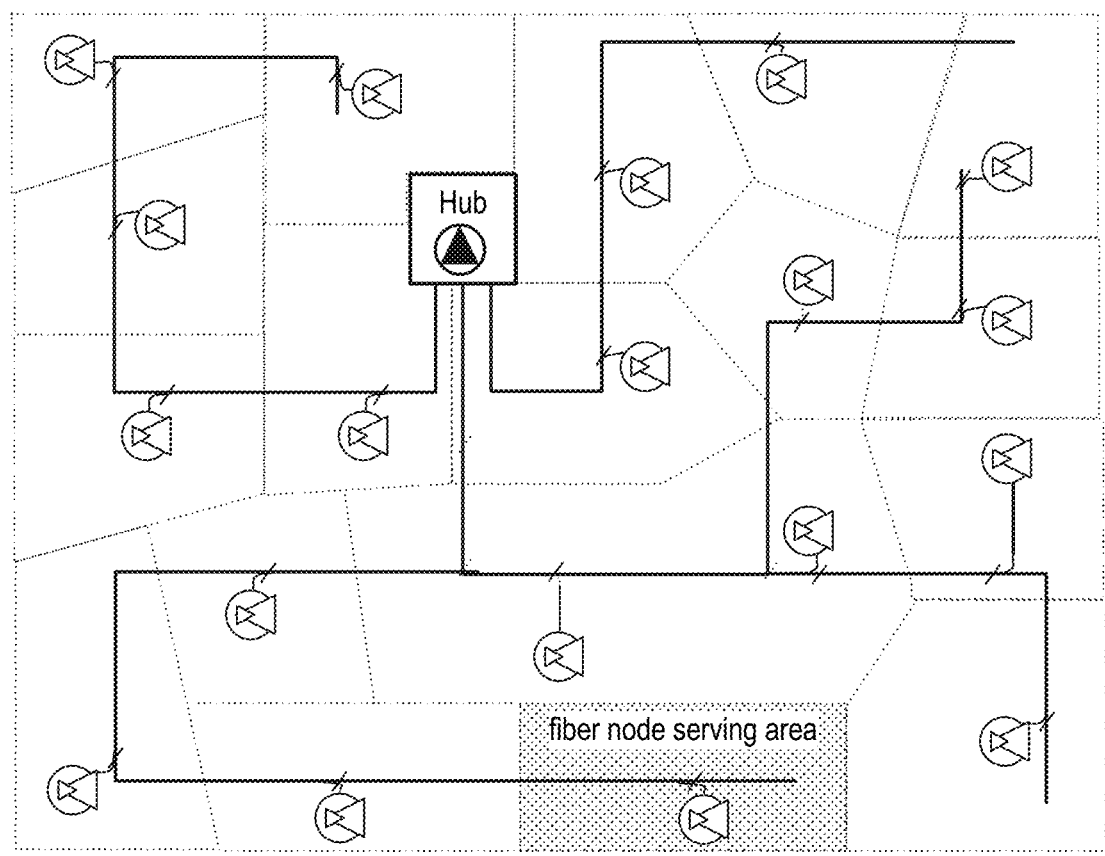
FIG. 1 is a schematic of a cable optical access network.
Figure 2:
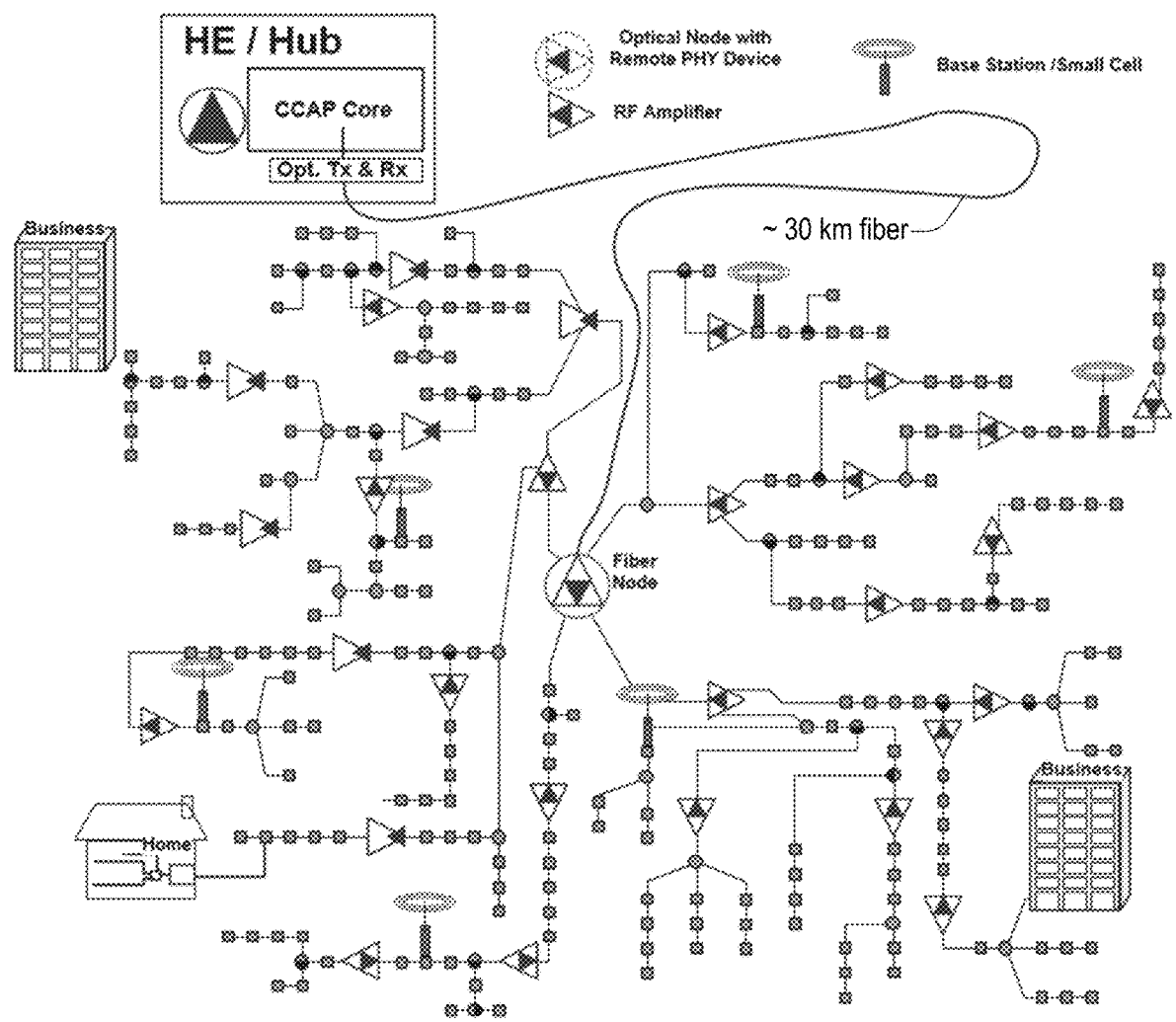
FIG. 2 is a schematic of a standard fiber node serving area.
Figure 3:
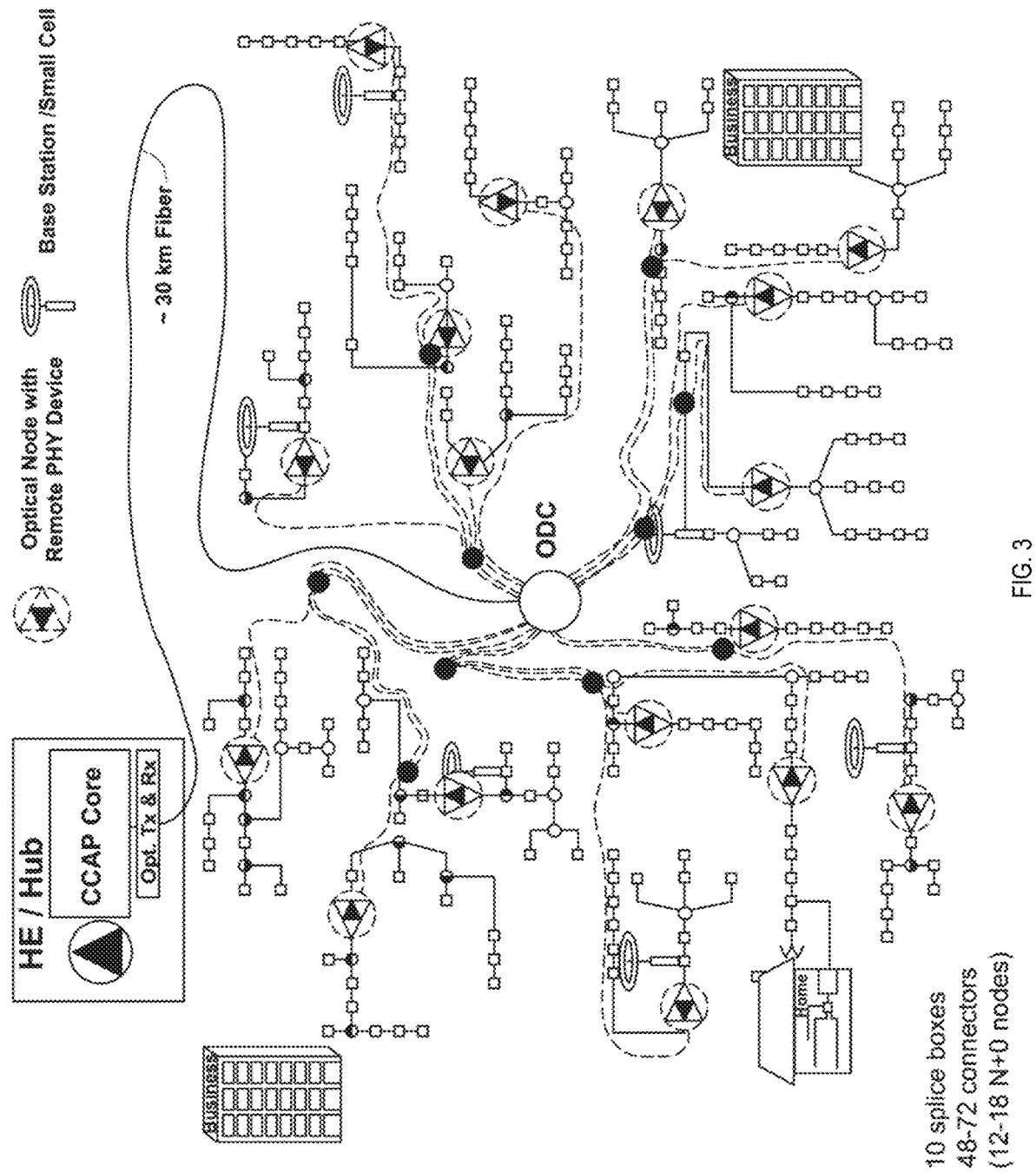
FIG. 3. is a schematic of a fiber node segmented into multiple N+0 fiber nodes.
Figure 4:
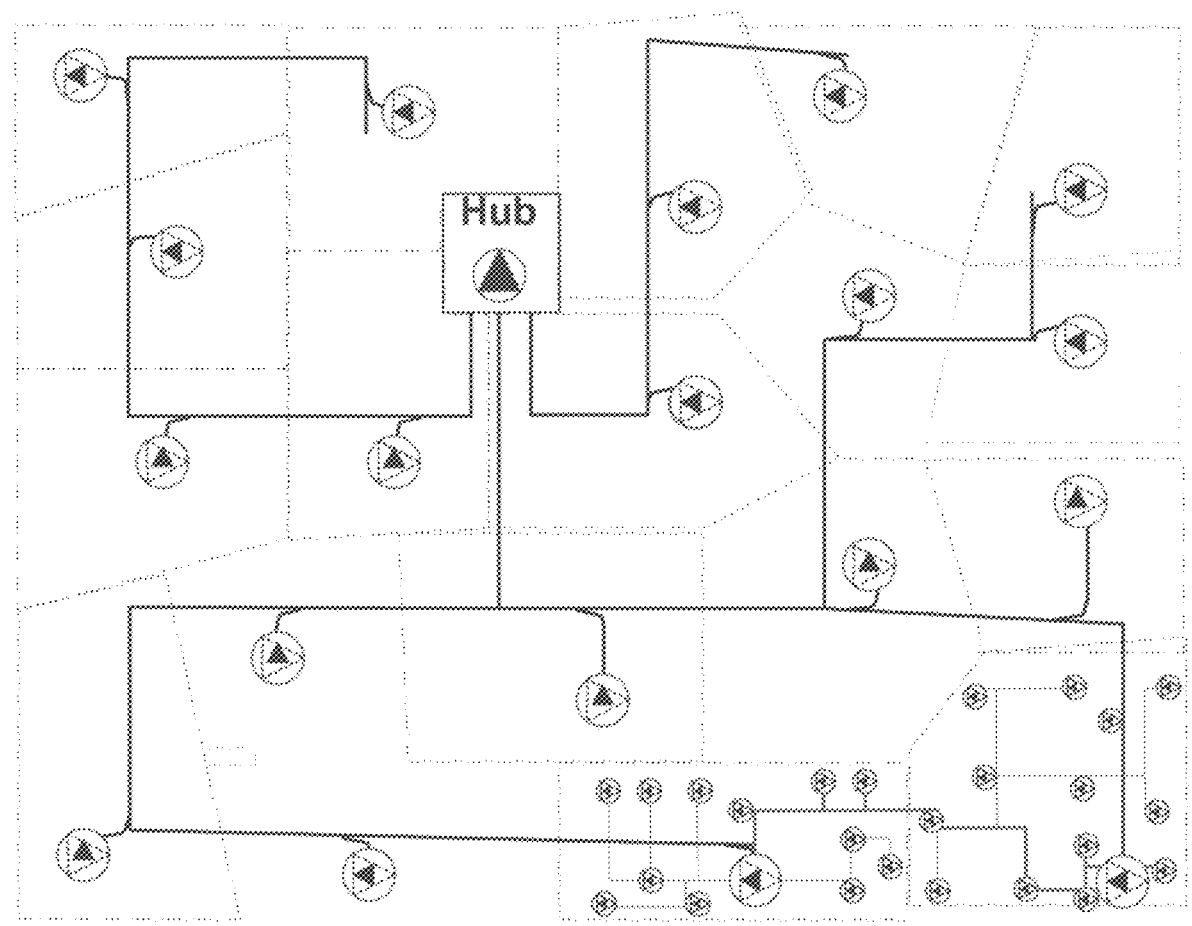
FIG. 4 is a schematic illustrating a means to achieve redundancy in a cable optical access network.

The legacy node that was served by only a few fibers becomes an optical distribution center (ODC), from which a larger number of fiber strands originate. Herein, the terms ODC and network node are used interchangeably. FIG. 3 shows a legacy node segmented into multiple N+0 mini nodes. This legacy node location with dissimilar fiber strand count of fibers coming in from the hub and fiber going to deeper points in the network becomes a prime location to leverage wavelength routing and manipulation. Keep in mind that not only are these new fibers are intended to serve these deeper fiber nodes but also business locations, cell sites and the end points of cable's next phase of evolution.
Redundancy As more fiber is laid out deeper in the network and the fiber end-points become closer to each other it becomes much easier to connect these endpoints and close the end point to achieve redundancy at the node level. FIG. 4 highlights the opportunity to achieve redundancy with the evolution towards fiber deeper where the proximity of deeper nodes from different legacy nodes is such that is very cost efficient to establish connectivity thereby closing the fiber loop to achieve redundancy. Having the capability of managing wavelengths at the legacy node location or ODC is critical to enable redundancy.

Figure 5:
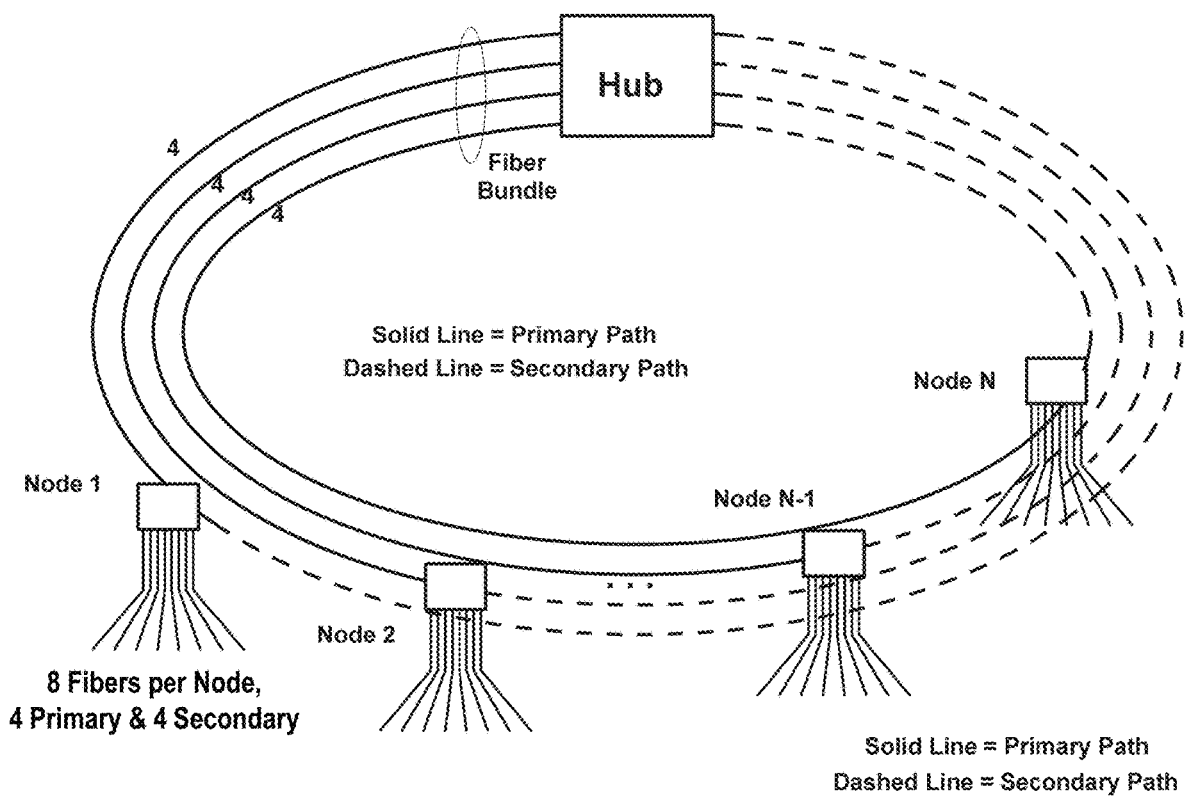
FIG. 5 is a schematic of a fiber allocation in an access network with fiber node redundancy.

From a fiber connectivity topology perspective, the fiber loops to provide redundancy at the node level become practical.
Reclaiming Stranded Resources Cable operators that already have built fiber links with redundant connectivity paths have multiple fiber strand rings in a loop configuration, as shown in FIG. 5. In this configuration a few fibers are dedicated per fiber node. In an example if four fibers are dedicated to a node through a primary path, and four fibers are dedicated to a node through a secondary path, at least a four-fiber strand fiber ring is required. In the same ring path other fibers would be dedicated to other nodes. Therefore, a ten-node fiber ring would require a forty-fiber strand ring. This is a prevalent configuration of an analog optics environment where limited wavelength multiplexing has been leveraged. As digital optics is introduced, wavelength multiplexing becomes practical. However, wavelength management tools are necessary. This disclosure describes a wavelength management system that enables this desired functionality.

Figure 6:
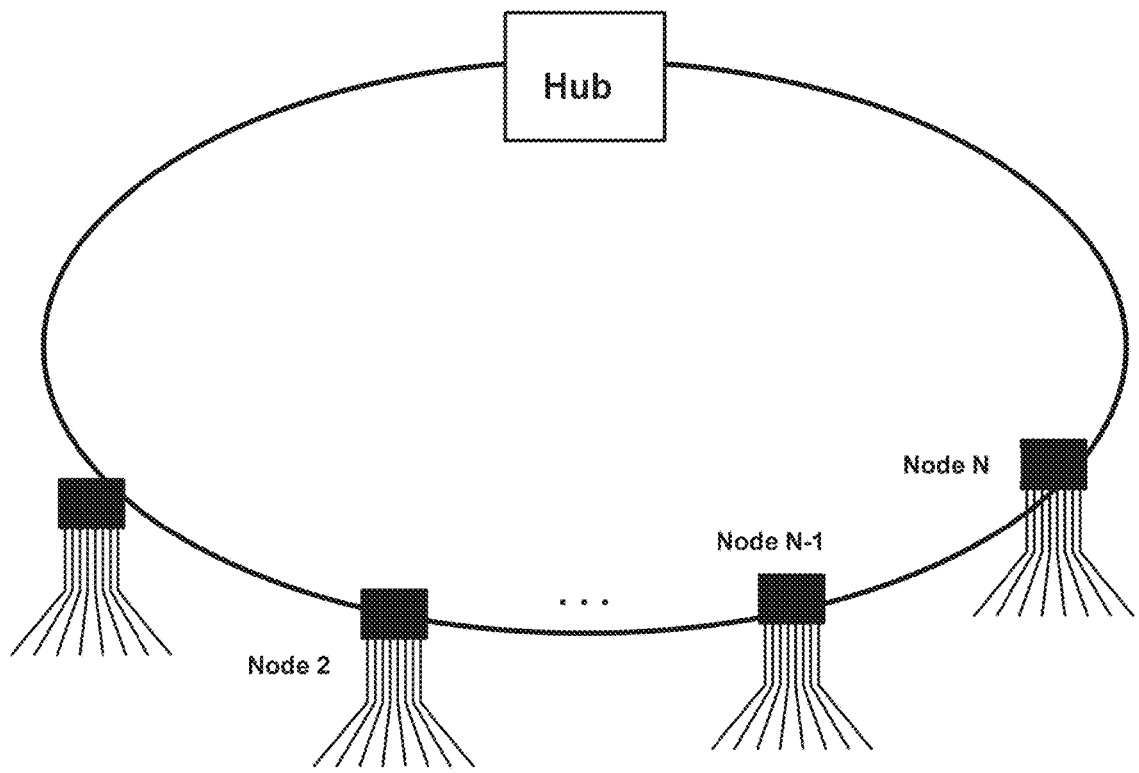
FIG. 6 is a schematic of illustrating leverage of a single fiber strand to achieve fiber node redundancy.

Leveraging dedicated wavelengths rather than dedicated fibers would be a more efficient use of resources. Instead of requiring a 40-fiber-strand ring for ten nodes you can use forty different wavelengths on a single fiber, using just one fiber strand ring, therefore saving thirty-nine fibers, as illustrated in FIG. 6.

In a hub of 30,000 HHP served by sixty nodes on environment, assuming six fiber rings of ten nodes per ring. The number of fibers that can be reclaimed increases from 39 for a single ring to 234 fibers reclaimed for the six rings in this hub.

This grooming of optical carriers to reclaim fiber capacity requires manually intensive provisioning. Having a flexible remotely controlled wavelength management system makes reclaiming fiber resources practical. The same advantage applies in non-redundant fiber topologies when leveraging wavelengths rather than fibers. This invention disclosure addresses the fiber reclaiming challenges in the optical access networks.

Wavelength manipulation has been conducted in the backbone portion of the network for many years. Today, wavelength routing is becoming more prevalent in the metropolitan and regional portions of the network. Backbone and even metropolitan networks may include mesh topologies which require highly complex ROADMs. In the access environment, a candidate topology is a ring topology and the distances traversed will most likely be less than 80 km.

Figure 7:
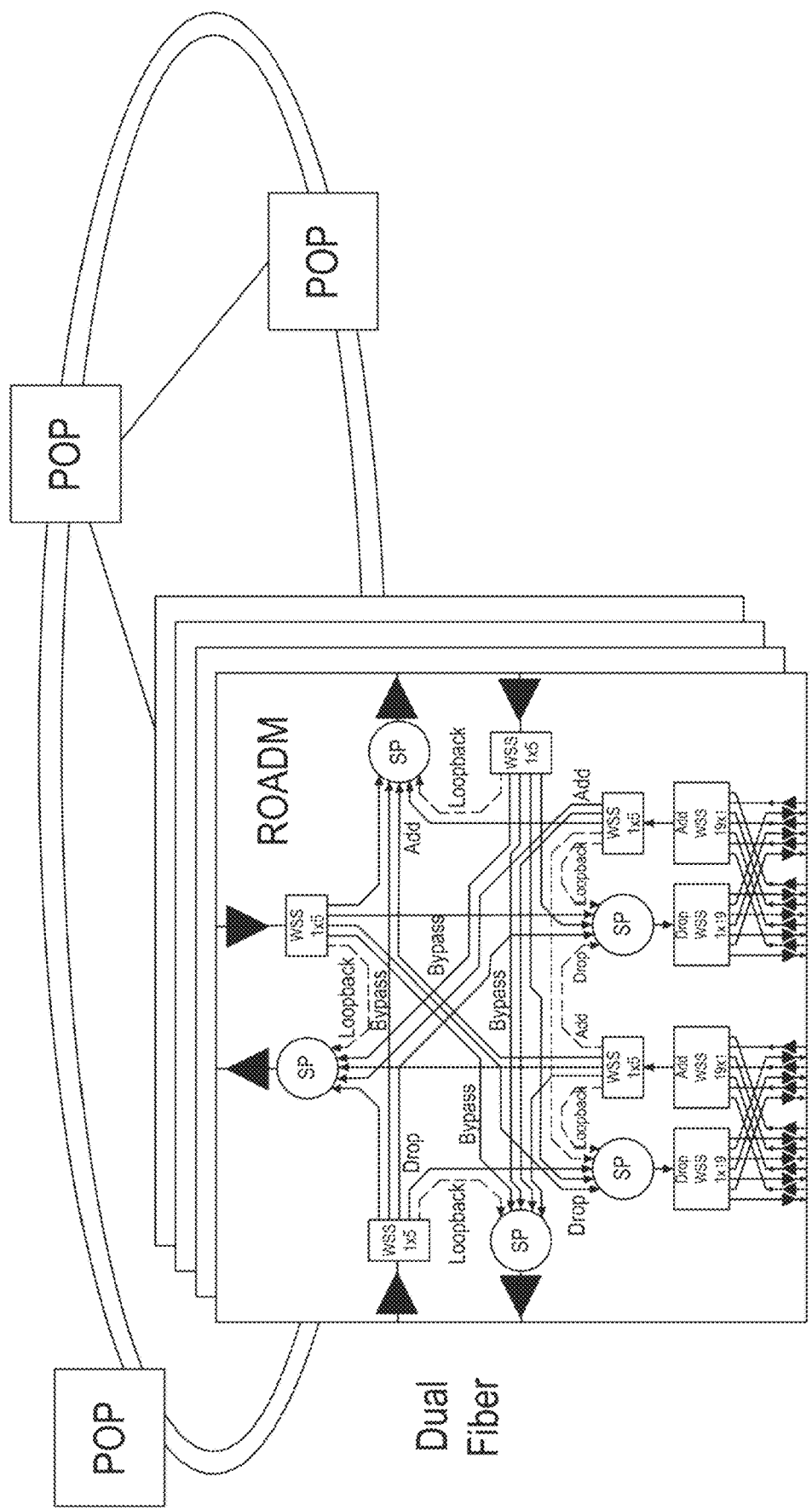
FIG. 7 is a schematic of a mesh backbone network with degree-3 reconfigurable optical add-drop multiplexer (ROADM).
Figure 8:
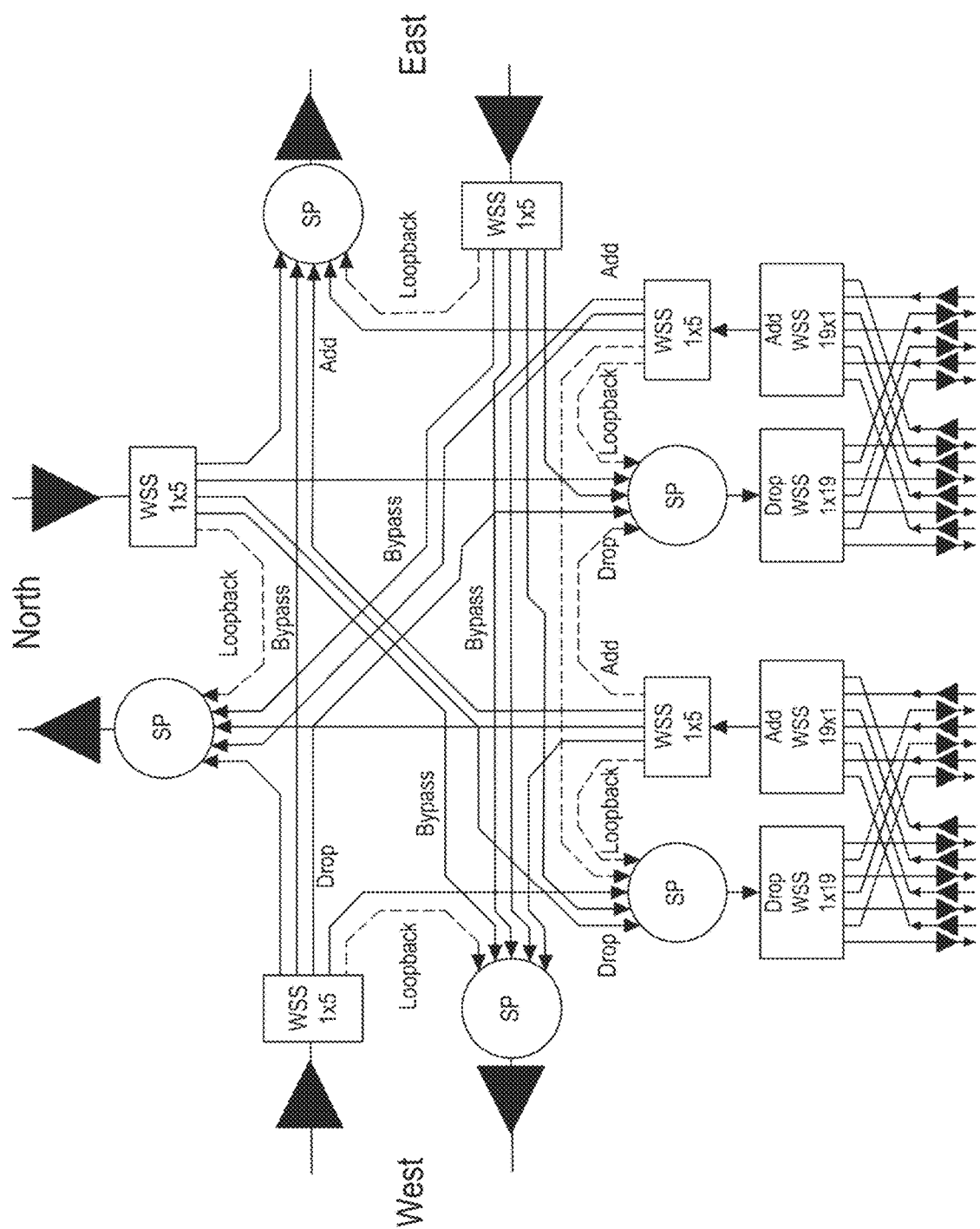
FIG. 8 illustrates the ROADM of FIG. 7 in more detail

FIG. 7 is a schematic of a mesh backbone network with degree-3 ROADM. FIG. 8 illustrates the ROADM of FIG. 7 in more detail, where three directions are supported on the WAN (wide area network) side (a degree-3 ROADM) and multiple tributaries are supported on the local side on the lower part of the diagram. The internal interconnecting optical circuits includes many bypass lanes to connect to the other WAN ports and also local connections to the tributary add/drop ports. In addition, it has optical loopback paths for troubleshooting purposes. Not shown in FIG. 8, backbone and metro ROADMs have also a number of embedded photodetectors as part of their management system. The complexity of the ROADM results in significant optical loss which requires the use of optical amplification and many of its optical ports.

Some of the optical splitters of FIG. 8 may be replaced by a wavelength selective switch (WSS). This adds complexity, but in case of higher complexity ROADM due to the number of splitter ports, it may be advantageous to use a WSS instead to keep the loss impact more manageable. Some simplification may be achieved as the existing approaches are used in the access environment this disclosure is focusing on.

Figure 9:
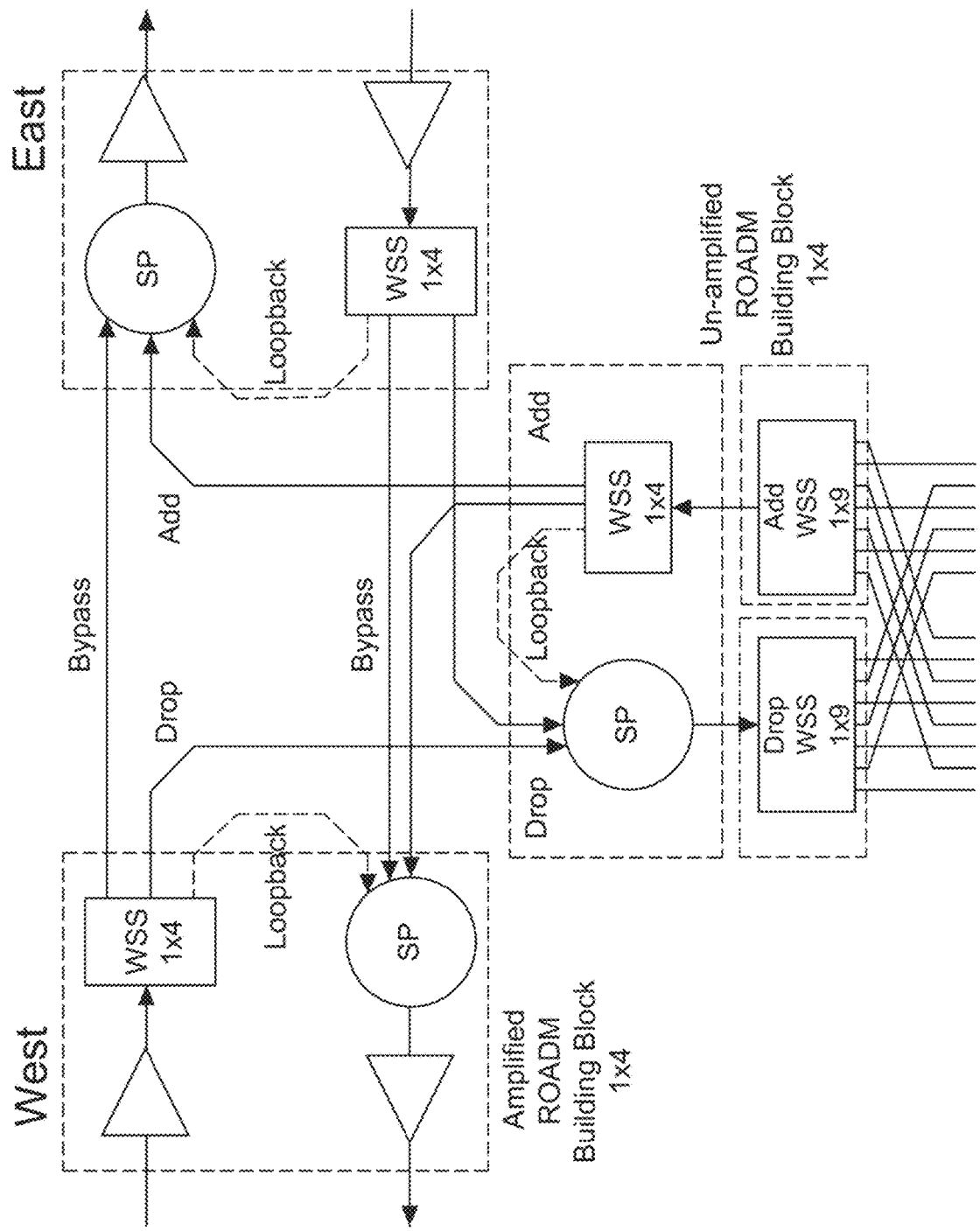
FIG. 9 is a schematic of a backbone ROADM approach adapted to access environment.
Figure 10:
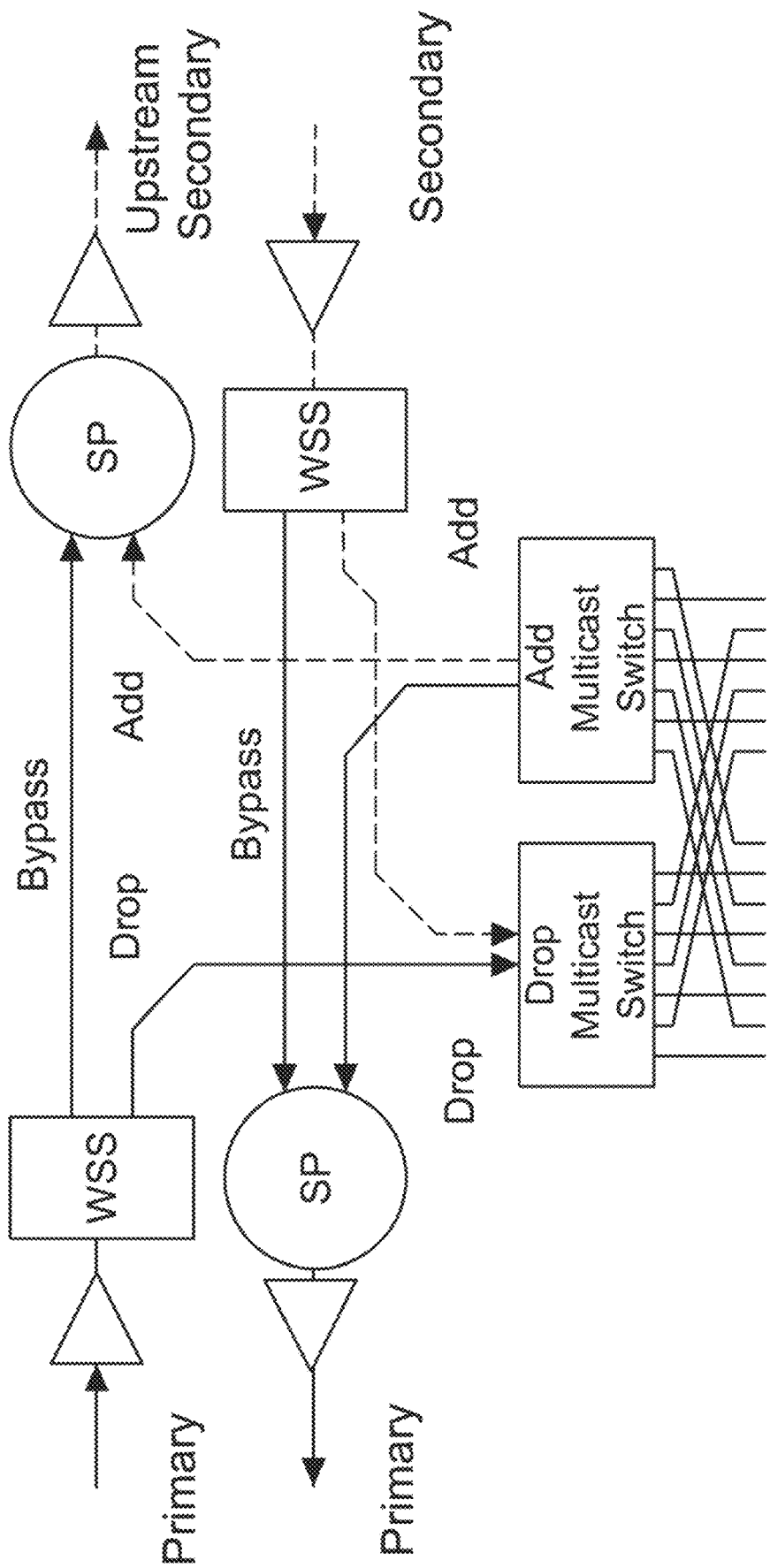
FIG. 10 is a schematic of a metro optimized ROADM approach adapted to access environment.

FIG. 9 is a schematic of a backbone ROADM approach adapted to access environment. FIG. 10 is a schematic of a metro optimized ROADM approach adapted to access environment. In each approach, the WSS is main element driving the complexity. In an access ring environment, only Degree-2 ROADM complexity is anticipated. Degree-2 comes from the two WAN directions that the ROADM connects to in a ring. In spite of this simplification, the approach of FIG. 9 uses five WSSs and the Metro optimized approach uses three WSSs and a pair of simpler multicast switches, which also drives to higher costs.

As shown in FIGS. 9 and 10, one fiber port is used to transmit signals in one direction out of the ROADM and another fiber port is used to receive signals from that same direction into the ROADM. These configurations hence do not support full duplex operation, which would decrease the number of required ports.

These systems have insertion losses of about 18 dB which demand the use of optical amplification on each of the optical paths.

Routing or switching of optical carriers based on wavelength have been used in the telecom industry extensively. The devices in the optical networks that conduct wavelength-based switching are called ROADMs. Because ROADMs are relative complex and expensive, they have mostly been used and designed for the backbone portion of optical networks. As demand for capacity increased and greater flexibility for efficient management of optical resources was required, the use of ROADM became necessary in metropolitan optical networks, where they are now being introduced.

Cable optical networks have few fibers penetrating deeper in the access network. Such networks' evolution toward distributed access architectures, where many more fibers extend from these few fiber strands. makes it attractive to introduce wavelength manipulation within the optical access or distribution network. Embodiments disclosed herein include a wavelength routing system designed for the access environment, which results in a much lower cost and complexity compared to system architectures that have been tailored for backbone and metro applications. This decreased cost and complexity enables introduction of this technology at the edge of an access network.

Figure 11:
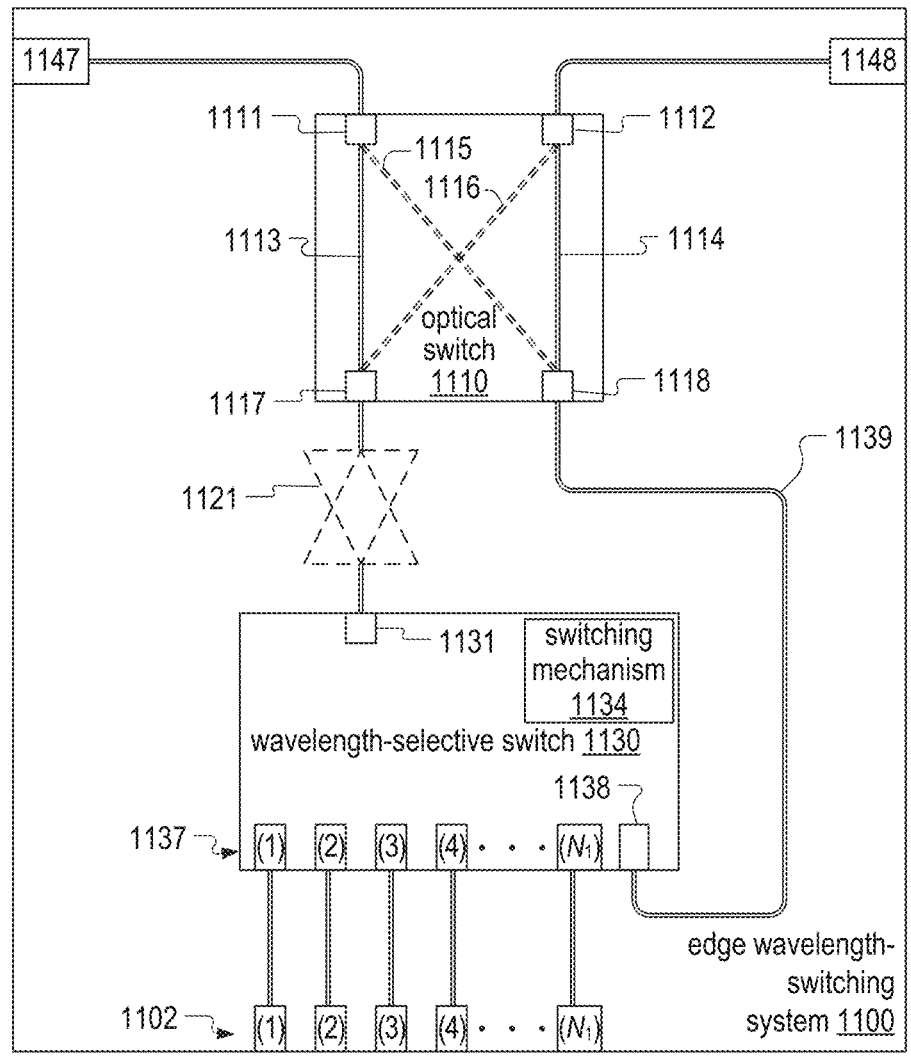
FIG. 11 is a schematic block diagram of an edge wavelength-switching system (EWSS), in an embodiment.

The introduction of wavelength manipulation at the network edge not only facilitates the provisioning of wavelengths services, but also enables the operator to more flexibly manage and optimize resources, which many times are left stranded until there are no more options than to manually reconfigure the assets for service provisioning. FIG. 11 illustrates a simplified wavelength switching system suitable for edge location within an optical network architecture.

FIG. 11 is a schematic block diagram of an edge wavelength-switching system (EWSS) 1100. EWSS 1100 includes an optical switch 1110 and a wavelength selective switch (WSS) 1130. Optical switch 1110 includes a west hub-side port 1111, an east hub-side port 1112, a west local-side port 1117, and an east local-side port 1118. WSS 1130 includes (i) a multiplexed port 1131 optically coupled to west local-side port 1117 and (ii) a bypass port optically 1138 coupled to east local-side port 1118 via a bypass link 1139, and (iii) a plurality of demultiplexed ports 1137 (1, 2, . . . , $N_1$). In embodiments, EWSS 1100 includes a bidirectional optical amplifier 1121 that optically couples west local-side port 1117 to multiplexed port 1131. Herein, two elements that are optically coupled, such as ports 1131 and 1117 may be coupled by at least one of (a) one or more optical fibers, (b) one or more optical waveguides, and (c) free-space light propagation. In embodiments, bidirectional optical amplifier 1121 includes an erbium-doped fiber amplifier (EDFA).

Optical switch 1110 is configured to operate in both (i) a parallel mode, in which the west and east hub-side ports 1111 and 1112 are optically coupled to the west and east local-side ports 1117 and 1118 respectively, and (ii) a crossed mode, in which the west and east hub-side ports 1111 and 1112 are optically coupled to the east and west local-side ports 1118 and 1117 respectively. In FIG. 11, solid lines 1113 and 1114 between ports of optical switch 1110 denote normal-mode operation, while dashed lines 1115 and 1116 between ports of optical switch 1110 denote failover-mode operation. In embodiments, the parallel mode and the crossed mode correspond respectively to a normal mode and a failover mode of optical switch 1100. In embodiments, the parallel mode and the crossed mode correspond respectively to a failover mode and a normal mode of optical switch 1100.

Herein and as known in the art of optical networking, the terms west and east denote relative directions with respect to a center of a device or network, akin to the designations left, right, top, and bottom. The terms west and east do not denote cardinal directions, e.g., as indicated by a compass, or any preferred orientation of a device or network disclosed herein.

EWSS 1100 includes local-side input/output (I/O) ports 1102(1-$N_1$) and hub-side I/O ports 1147 and 1148. In embodiments, west hub-side port 1111 and east hub-side port 1112 either function as, or are directly optically coupled to, hub-side I/O ports 1147 and 1148, respectively. In embodiments, demultiplexed ports 1137(1-N) function as, or are directly optically coupled to, local-side I/O ports 1102 (1-$N_1$). In embodiments, the total number of I/O ports of EWSS is $M_1=(N_1+2)$, and EWSS 1100 has no I/O ports other than those optically coupled to west hub-side port 1111, east hub-side port 1112, and to one of demultiplexed ports 1137(1-$N_1$).

In embodiments, EWSS 1100 lacks any additional wavelength selective switches other than WSS 1130. In embodiments of EWSS 1100, a ratio of wavelength-selective switches, such as 1130 to optical switches, such as switch 1110, equals one. Additional switches are unnecessary when $M_1=(N_1+2)$, and an additional wavelength-selective switch would increase the cost of WSS 1130.

In embodiments, EWSS 1100 lacks a receiver, of which a coherent receiver and a coherent transceiver are examples. For example, EWSS lacks a coherent receiver between any of its local-side I/O ports 1102 and either hub-side I/O ports 1147, 1148. EWSS 1100 may be configured to receive data from a coherent receiver of downlink premise host equipment optically coupled to one of local-side I/O ports 1102 (1-$N_1$). Adding a coherent receiver to EWSS 1100 would increase its cost. Herein, premise host equipment includes customer premises equipment and terminal equipment. Examples of premise host equipment include telephones, set-top boxes, routers, digital subscriber line routers, gateways, residential gateways, decoder boxes, voice ports, DSL splitters, POTS splitters, VoIP base stations, private branch exchange switching equipment, key telephone systems, and hybrid telephone systems.

WSS 1130 includes a switching mechanism 1134 configured to route an optical signal entering WSS 1130 via multiplexed port 1131 to any of demultiplexed ports 1137 according to a center wavelength of the optical signal. Switching mechanism 1134 may include at least one of (i) microelectromechanical mirrors, (ii) a liquid-crystal polarizer, (iii) a liquid-crystal-on-silicon beam steerer, and (iv) tunable optical resonators.

Figure 12:
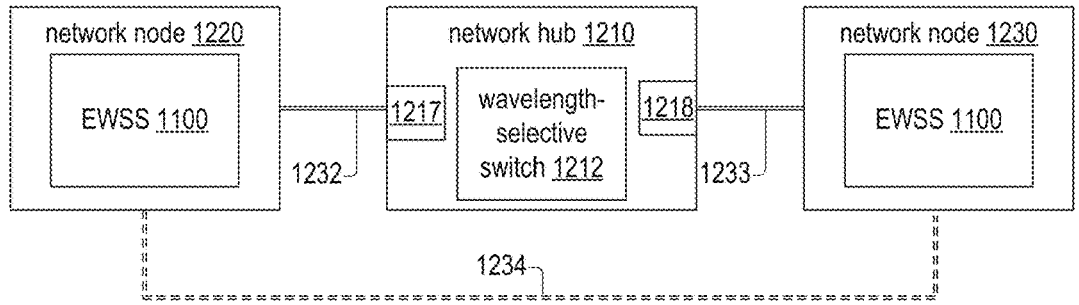
FIG. 12 is a schematic block diagram of an optical network that includes an EWSS of FIG. 11, in an embodiment.

FIG. 12 is a schematic block diagram of an optical network 1200, which may be an access network. Optical network 1200 includes a network hub 1210 and network nodes 1220 and 1230 communicatively coupled to network hub 1210 via communication links 1232 and 1233 respectively. Communication links 1232 and 1233 may be optical-fiber communication links. Network nodes 1220 and 1230 may be indirectly communicatively coupled via network hub 1210 and/or may be directly coupled, e.g., optically coupled, via a communication link 1234. In embodiments, network hub 1210, network node 1220, and network node 1230 are optically coupled according to a network topology, such as a ring topology or a bus topology. Network hub 1210 includes WSS 1212, a west local-side port 1217, and an east local-side port 1218, to which communication links 1232 and 1233 are optically coupled, respectively.

Figure 13:
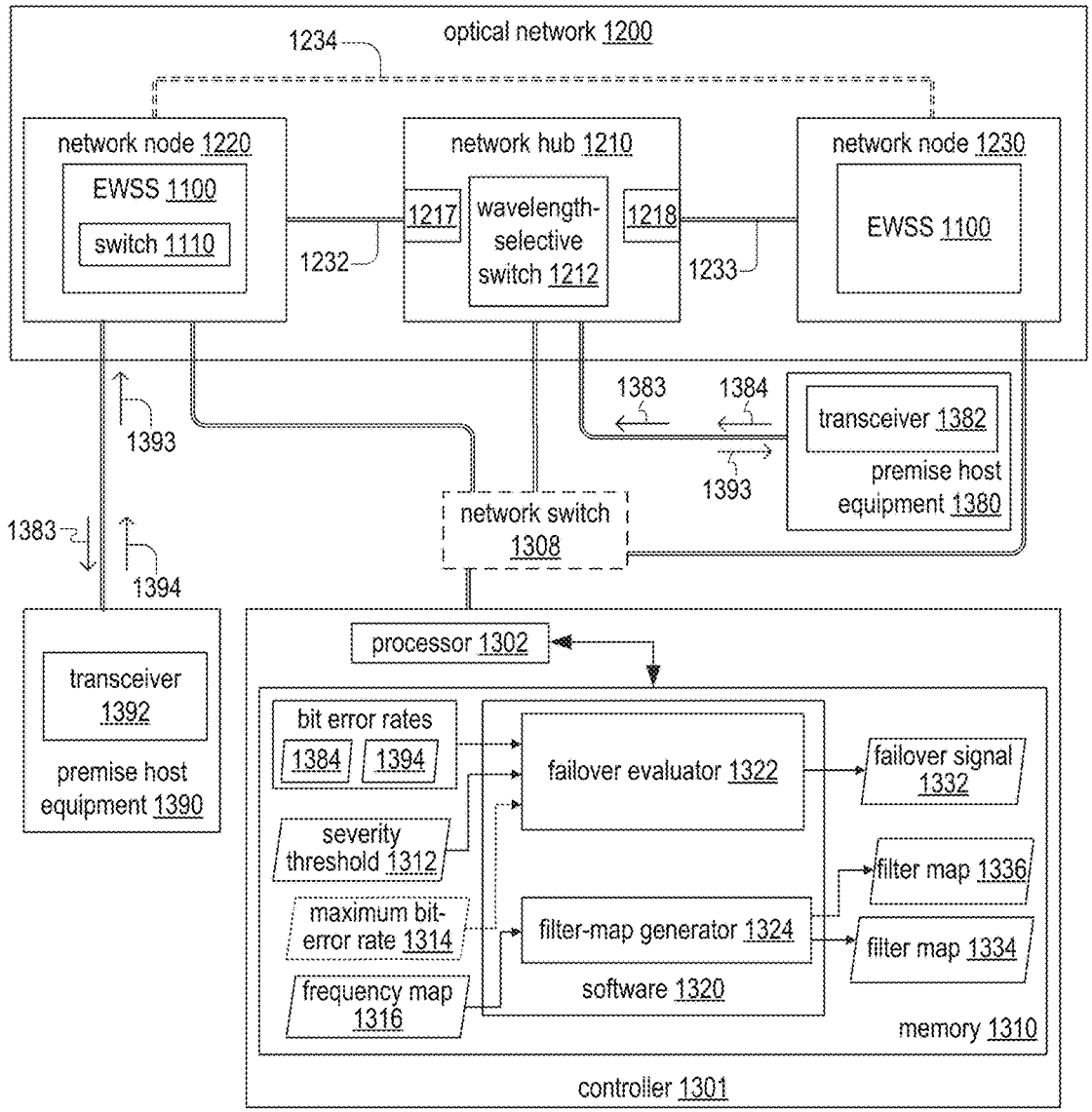
FIG. 13 is a schematic block diagram of an optical network, which includes the optical network of FIG. 12 and a controller, in an embodiment.

FIG. 13 is a schematic block diagram of an optical network 1300, which includes optical network 1200 and a controller 1301. Controller 1301, and hence components thereof, is communicatively coupled to each of network hub 1210 and network nodes 1220 and 1230. In embodiments, optical network 1300 includes networking hardware 1308, and optical network 1300 is communicatively coupled to each of network hub 1210 and network nodes 1220 and 1230 via networking hardware 1308. Controller 1301 may include networking hardware 1308. Networking hardware 1308 may include at least one of a network switch, a router, and a gateway, any of which may operate via wired and/or wireless communication protocols.

FIG. 13 includes premise host equipment 1380 and 1390, which include respective transceivers 1382 and 1392. In embodiments, at least one of transceivers 1382 and 1392 is a coherent transceiver. Premise host equipment 1380 is optically coupled to network hub 1210. Premise host equipment 1390 is optically coupled to network node 1220, e.g., to one of local-side I/O ports $1102(1-N_1)$. Without departing from the scope of embodiments herein, premise host equipment 1380 and 1390 may be communicatively coupled via non-optical means to network hub 120 and network node 1220 respectively, e.g., via twisted-pair cabling, coaxial cabling, or a wireless communication channel.

In embodiments, transceiver 1392 is configured to generate and transmit a bit stream 1393 to transceiver 1382 via network node 1220 and network hub 1210. Transceiver 1382 generates a bit-error rate 1384 from bit stream 1393, e.g., via an error detection technique. In embodiments, transceiver 1382 is configured to generate and transmit a bit stream 1383 to transceiver 1392 via network hub 1210 and network node 1220. Transceiver 1392 generates a bit-error rate 1394 from bit stream 1383, e.g., via an error detection technique. Since premise host equipment 1380 and 1390 include respective transceivers 1382 and 1392, inclusion of a coherent transceiver in network node 1220 (e.g., in EWSS 1100), is not necessary, and would hence add costs with no benefit. Candidate error detection techniques include a checksum function, a parity check, and cyclic redundancy check.

Controller 1301 includes a processor 1302 and a memory 1310. In embodiments, at least one of processor 1302 and a memory 1310 is communicatively coupled to components of optical network 1200, e.g., network hub 1210 and network nodes 1220 and 1230. Memory 1310 is configured to store bit-error rates 1384 received from transceiver 1382. In embodiments, memory 1310 stores a severity threshold 1312. In embodiments, severity threshold 1312 is a number of consecutive bit-error rates that exceeds a maximum allowable bit-error rate, which memory 1310 may store as maximum bit-error rate 1314.

Memory 1310 stores software 1320, which includes at least one of a bit-stream generator 1321, a failover evaluator 1322, and a filter-map generator 1324 as computer-readable instructions that, when executed by processor 1302, control processor 1302 to implement functions described herein.

When executed by processor 1302, failover evaluator 1322 controls processor 1302 to (i) determine a bit-error-rate severity from bit-error rates 1384; and (ii) control optical switch 1110 of the network node 1220 to switch from normal mode to failover mode when the bit-error-rate severity exceeds severity threshold 1312. In embodiments, failover evaluator 1322 generates a failover signal 1332 that is transmitted to network node 1220, which switches to its failover mode when failover signal 1332 indicates that the determined bit-error-rate severity exceeds severity threshold 1312. Failover signal 1332 may include the determined bit-error severity.

In embodiments, memory 1310 stores a frequency map 1316 and at least one of a filter map 1334 and a filter map 1336. Frequency map 1316 includes a plurality of frequency sub-bands spanning a frequency range. In embodiments, at least one of the plurality of frequency sub-bands is designated as a drop sub-band, and no sub-bands are designated as a bypass sub-band. In embodiments, at least one of the plurality of frequency sub-bands is designated as a drop sub-band, and at least one of the plurality of frequency sub-bands is designated as a bypass sub-band. In embodiments, each of the plurality of frequency sub-bands is designated as either a drop sub-band or a bypass sub-band. Frequency map 1316 may also include undesignated frequency sub-bands within the frequency range, that is, frequency sub-bands designated as neither a drop sub-band nor a bypass sub-band.

Wavelength selective switch 1130 functions according to the filter map, either filter map 1334 or 1336 for example, received from controller 1130. Filter map 1334 defines bypass frequencies as all frequencies within the frequency range of frequency map 1316 designated as drop sub-bands. Filter map 1336 defines bypass frequencies as all frequencies within the frequency range of frequency map 1316 that are not part of a drop sub-band, such that bypass frequencies include both drop sub-bands and undesignated sub-bands.

Figure 14:
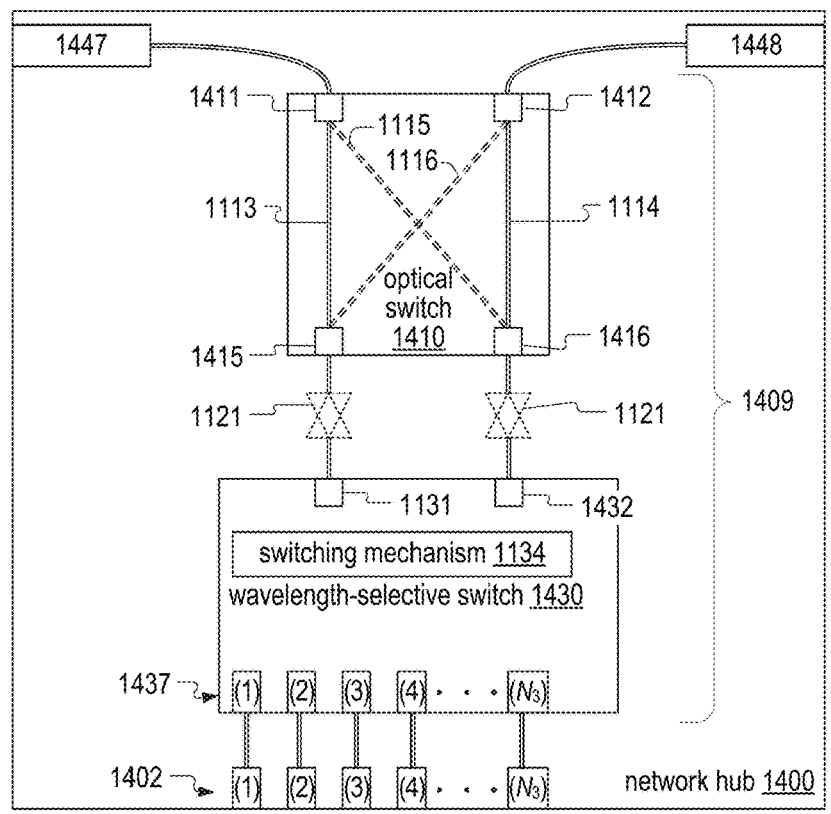
FIG. 14 is a schematic block diagram of a first network hub, which is an example of network hub of the optical network of FIG. 12, in an embodiment.
Figure 15:
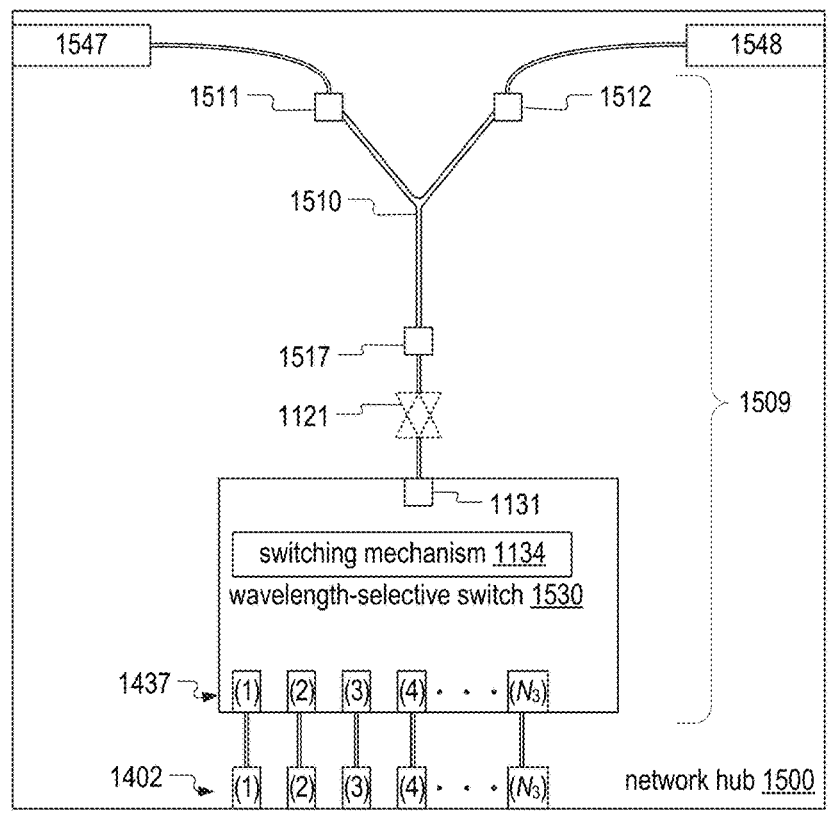
FIG. 15 is a schematic block diagram of a second network hub, which is an example of network hub of the optical network of FIG. 12, in an embodiment.

In embodiments, whether controller 1301 employs filter map 1334 or filter map 1336 depends on whether each local-side port of network hub 1210 outputs the different optical carrier frequencies, as in FIG. 14, or identical sets of optical carrier frequencies, as in FIG. 15.

FIG. 14 is a schematic block diagram of a network hub 1400, which is an example of network hub 1210 of optical network 1200, FIG. 12. Network hub 1400 includes an optical switch 1410 and a WSS 1430. Optical switch 1410 is analogous to optical switch 1110, where its port designations of "hub side" and "local side" are switched such that the hub side ports are proximate WSS 1430. Accordingly, optical switch 1410 includes a west local-side port 1411, an east local-side port 1412, a west hub-side port 1415, and an east hub-side port 1416.

WSS 1430 is equivalent to WSS 1130, FIG. 11, without bypass port 1138 and with the addition of a second multiplexed port 1432 coupled to east hub-side port 1118. Accordingly, WSS 1430 includes (i) multiplexed port 1131 optically coupled to west hub-side port 1415 and (ii) second multiplexed port 1432 coupled to east hub-side port 1416, and (iii) a plurality of demultiplexed ports $1437(1, 2, \ldots, N_3)$, where $N_3 \geq 2$. In embodiments, EWSS 1400 includes one bidirectional optical amplifier 1121 that optically couples west hub-side port 1415 to multiplexed port 1131 and one bidirectional optical amplifier 1121 that optically couples west hub-side port 1416 to multiplexed port 1432. WSS 1430 includes switching mechanism 1134, which is configured to optically couple to any of the $N_3$ demultiplexed ports 1437 to either multiplexed port 1131 or multiplexed port 1432. Optical switch 1410, WSS 1430 and, when included, optical amplifiers 1121, comprise a wavelength-switching system 1409.

Network hub 1400 includes $N_3$ hub-side I/O ports 1402 (1-$N_3$) and two local-side I/O ports 1447 and 1448, which are examples of ports 1217 and 1218, respectively. In embodiments, (i) west local-side port 1411 and east local-side port 1412 function as local-side I/O ports 1447 and 1448 respectively, and/or (ii) demultiplexed ports 1437(1-$N_3$) function as I/O ports 1402(1-$N_3$). For example, west local-side port 1411 and I/O port 1447 correspond to the same opto-mechanical hardware. In embodiments, network hub 1400 has a total number of the plurality of I/O ports $M_3=(N_3+2)$. FIG. 14 illustrates one such embodiment, in which network hub 1400 has no I/O ports other than those optically coupled to west local-side port 1411, east local-side port 1412, and each of demultiplexed ports 1437(1-$N_3$). In embodiments, network hub 1400 lacks any additional wavelength selective switches other than WSS 1430. Additional switches are unnecessary when $M_3=(N_3+2)$, and an additional wavelength-selective switch would increase the cost of network hub 1400.

WSS 1430's configuration of two multiplexed ports 1131 and 1432 optically coupled to optical switch 1410 results in optical channels exiting local-side port 1447 differing from optical channels exiting local-side port 1448. For example, if optical network 1200 carries Q channels with respective carrier wavelengths include $\lambda_1, \lambda_2, \ldots, \lambda_Q$, each carrier wavelength exits one and only one of local-side port 1447 and 1448. For example, odd-index channels $\{\lambda_1, \lambda_3, \lambda_5, \ldots\}$ may exit local-side port 1447 while even-index channels $\{\lambda_2, \lambda_4, \lambda_6, \ldots\}$ may exit local-side port 1448.

Herein, a carrier wavelength is a center wavelength $\lambda_0$ of an optical channel that has a finite spectral width $\delta\lambda$. Routing of a center wavelength, by a WSS for example, refers to routing not just the center wavelength, but the finite spectral width of the optical channel, such that wavelengths in a spectral band $\lambda_0 \pm \frac{1}{2}\delta\lambda$ are routed.

In embodiments, network hub 1210 of optical network 1300, FIG. 13, corresponds to network hub 1400 and filter-map generator 1324 pertain to network node 1220. In such embodiments, processor 1302 executes filter-map generator 1324 controls control network node 1220 to route, according to filter map 1334, each of the bypass sub-bands (and, in embodiments, only the bypass sub-bands) to the bypass port of the wavelength selective switch of the first network node. Network node 1220 includes wavelength selective switch 1130, which routes wavelengths (or equivalently channels, or sub-bands) according to filter map 1334. For example, of the aforementioned Q channels carried by optical network 1200, even-index channels $\{\lambda_2, \lambda_4, \lambda_6, \ldots\}$ may be bypass sub-bands such that switching mechanism 1134 of EWSS 1100 of network node 1220 routes even-index channels $\{\lambda_2, \lambda_4, \lambda_6, \ldots\}$ to bypass port 1138 of wavelength-selective switch 1130. In embodiments, filter map 1334 dictates that switching mechanism 1134 of EWSS 1100 of network node 1220 routes only bypass sub-bands, e.g., even-index channels $\{\lambda_2, \lambda_4, \lambda_6, \ldots\}$, to bypass port 1138 of wavelength-selective switch 1130.

Filter map 1334 optimizes fiber spectrum efficiency when network hub 1210 of optical network 1300 corresponds to network hub 1400. For example, when filter map 1334 designates odd-index channels $\{\lambda_1, \lambda_3, \lambda_5, \ldots\}$ as drop sub-bands for network node 1220 and even-index channels $\{\lambda_2, \lambda_4, \lambda_6, \ldots\}$ for network node 1230, an efficient configuration of network hub 1210 is for network hub 1400 to route odd-index channels $\{\lambda_1, \lambda_3, \lambda_5, \ldots\}$ "west" from port 1217 directly to network node 1220 and even-index channels $\{\lambda_2, \lambda_4, \lambda_6, \ldots\}$ "east" from port 1218 directly to network node 1230.

FIG. 15 is a schematic block diagram of a network hub 1500, which is an example of network hub 1210 of optical network 1200, FIG. 12. Network hub 1500 includes $N_3$ hub-side I/O ports 1402(1-$N_3$) and two local-side I/O ports 1547 and 1548, which are examples of ports 1217 and 1218, respectively. In embodiments, network hub 1500 has a total number of the plurality of I/O ports $M_3=(N_3+2)$.

Network hub 1500 includes a 1-by-2 optical splitter 1510 and WSS 1530. WSS 1530 is equivalent to WSS 1430 without multiplexed port 1432. Optical splitter 1510 includes a west local-side port 1511, an east local-side port 1512, and a hub-side port 1517. In embodiments, network hub 1500 includes bidirectional optical amplifier 1121 that optically couples hub-side port 1517 to multiplexed port 1131. WSS 1530 includes switching mechanism 1134, which is configured to optically couple to any of the $N_3$ demultiplexed ports 1437 to multiplexed port 1131. Optical splitter 1510, WSS 1530 and when included, optical amplifier 1121, comprise a wavelength-switching system 1509.

WSS 1530's configuration of a single multiplexed port 1131 optically coupled to splitter 1510 results in optical channels exiting local-side I/O port 1547 being the same as optical channels exiting local-side I/O port 1548. For example, if optical network 1200 carries Q channels $\{1, 2, \ldots, Q\}$ with respective carrier wavelengths $\{\lambda_1, \lambda_2, \ldots, \lambda_Q\}$, each carrier wavelength exits both local-side I/O ports 1547 and 1548.

In embodiments, network hub 1210 of optical network 1300, FIG. 13, corresponds to network hub 1500 and filter-map generator 1324 pertain to network node 1220. In such embodiments, processor 1302 executes filter-map generator 1324 to control network node 1220 to route, according to filter map 1336, all sub-bands other than drop sub-bands to the bypass port of the wavelength selective switch of the first network node. Network node 1220 includes wavelength selective switch 1130, which routes wavelengths (or equivalently channels, or sub-bands) according to filter map 1336. For example, of the aforementioned Q channels carried by optical network 1200, odd-index channels $\{\lambda_1, \lambda_3, \lambda_5, \ldots\}$ may be drop sub-bands such that switching mechanism 1134 of EWSS 1100 of network node 1220 routes all wavelengths other than odd-index channels $\{\lambda_1, \lambda_3, \lambda_5, \ldots\}$ to bypass port 1138 of wavelength-selective switch 1130.

Benefits of filter map 1336 used with network hub 1500 include faster failover in network node 1220 compared to use of filter map 1334 with network hub 1400. When network hub 1400 functions as network hub 1210 in optical network 1300 and controller 1301 controls network node 1220 and network hub 1400 to operate in failover mode, the respective wavelength-length switches of node 1220 and hub 1400 reconfigure to appropriately route the bypass sub-bands and drop sub-bands. By contrast, when network hub 1500 functions as network hub 1210 and network node 1220 receives filter map 1336, switching to failover mode does not require reconfiguration of network hub 1500 because ports 1511 and 1512 of network hub 1500 receive the same uplink sub-bands from wavelength selective switch 1530.

Figure 16:
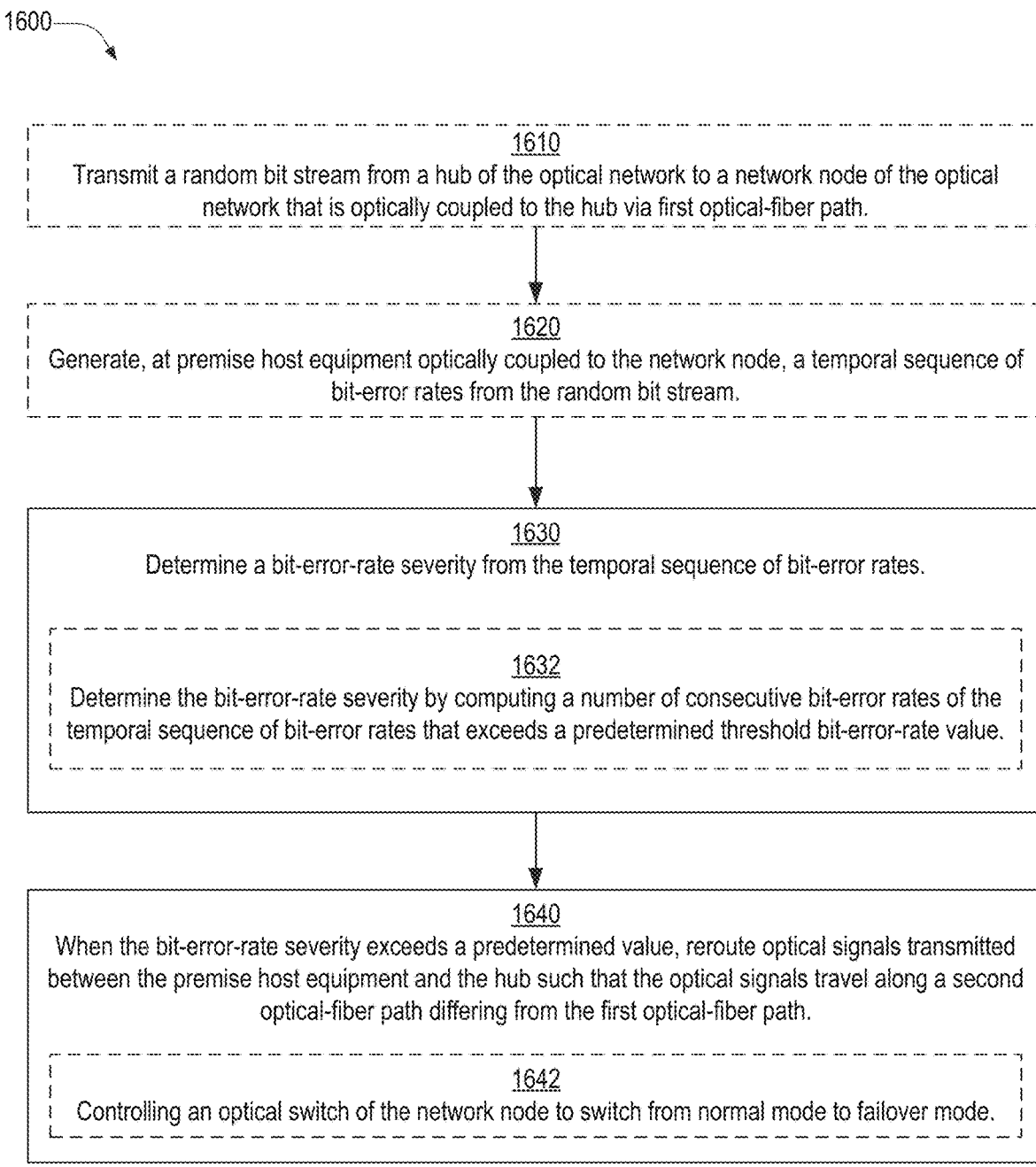
FIG. 16 is a flowchart illustrating a failover recovery method for an optical network, in an embodiment.

FIG. 16 is a flowchart illustrating a failover recovery method 1600 for an optical network. Failure recovery method 1600 may be implemented within one or more aspects of optical network 1300. In embodiments, method 1600 is implemented by processor 1302 executing computer-readable instructions of software 1320. Method 1600 includes steps 1630 and 1640. In embodiments, method 1600 also includes at least one of steps 1610 and 1620.

Step 1610 includes transmitting a random bit stream from a second premise host equipment to a transceiver of a first premise host equipment via a hub of the optical network and the network node. The first premise host equipment is optically coupled to the network node, which is optically coupled to the hub via a first optical-fiber path. In a first example of step 1610, transceiver 1392 of premise host equipment 1390 transmits random bit stream 1393 to transceiver 1382 of premise host equipment 1380 via network node 1220 and network hub 1210. In a second example of step 1610, transceiver of premise host equipment 1380 transmits random bit stream 1383 to transceiver 1392 of premise host equipment 1390 via network hub 1210 and network node 1220.

Step 1620 includes generating, at the first premise host equipment, a temporal sequence of bit-error rates from the random bit stream. In a first example of step 1620, premise host equipment 1380 generates bit-error rates 1384 from random bit stream 1393. In a second example of step 1620, premise host equipment 1390 generates bit-error rates 1394 from random bit stream 1383.

Step 1630 includes determining a bit-error-rate severity from the temporal sequence of bit-error rates. In an example of step 1630, failover evaluator 1322 determines a bit-error-rate severity from either bit-error rates 1384 or bit-error rates 1394. The content of failover signal 1332 depends on whether the determined bit-error-rate exceeds severity threshold 1312. In embodiments, step 1630 includes step 1632, which includes determining the bit-error-rate severity by computing a number of consecutive bit-error rates of the temporal sequence of bit-error rates that exceed a predetermined threshold bit-error-rate value. In an example of step 1632, failover evaluator 1322 determines the bit-error-rate severity by computing a number of consecutive bit-error rates of bit-error rates 1384, or bit-error rates 1394, that exceeds severity threshold 1312.

Step 1640 includes, when the bit-error-rate severity exceeds a predetermined value, rerouting optical signals transmitted between the premise host equipment and the hub such that the optical signals travel along a second optical-fiber path differing from the first optical-fiber path. In a first example of step 1640, the bit-error rate severity of bit-error rates 1384 exceeds severity threshold 1312. Consequentially, network node 1220 reroutes optical signals transmitted between premise host equipment 1380 and network hub 1210 such that the optical signals travel from network node 1220 to network hub 1210 via communication links 1234 and 1233 instead of via communication link 1232. In a second example of step 1640, the bit-error rate severity of bit-error rates 1394 exceeds severity threshold 1312. Consequentially, network hub 1210 reroutes optical signals transmitted between premise host equipment 1390 and network node 1220 such that the optical signals travel from network hub 1210 to network node 1220 via communication links 1233 and 1234 instead of via communication link 1232.

In embodiments, step 1640 includes step 1642, which includes controlling an optical switch of the network node to switch from normal mode to failover mode. In an example of step 1642, controller 1301 controls optical switch 1110 of network node 1220 by transmitting failover signal 1332 thereto.

Figure 17:
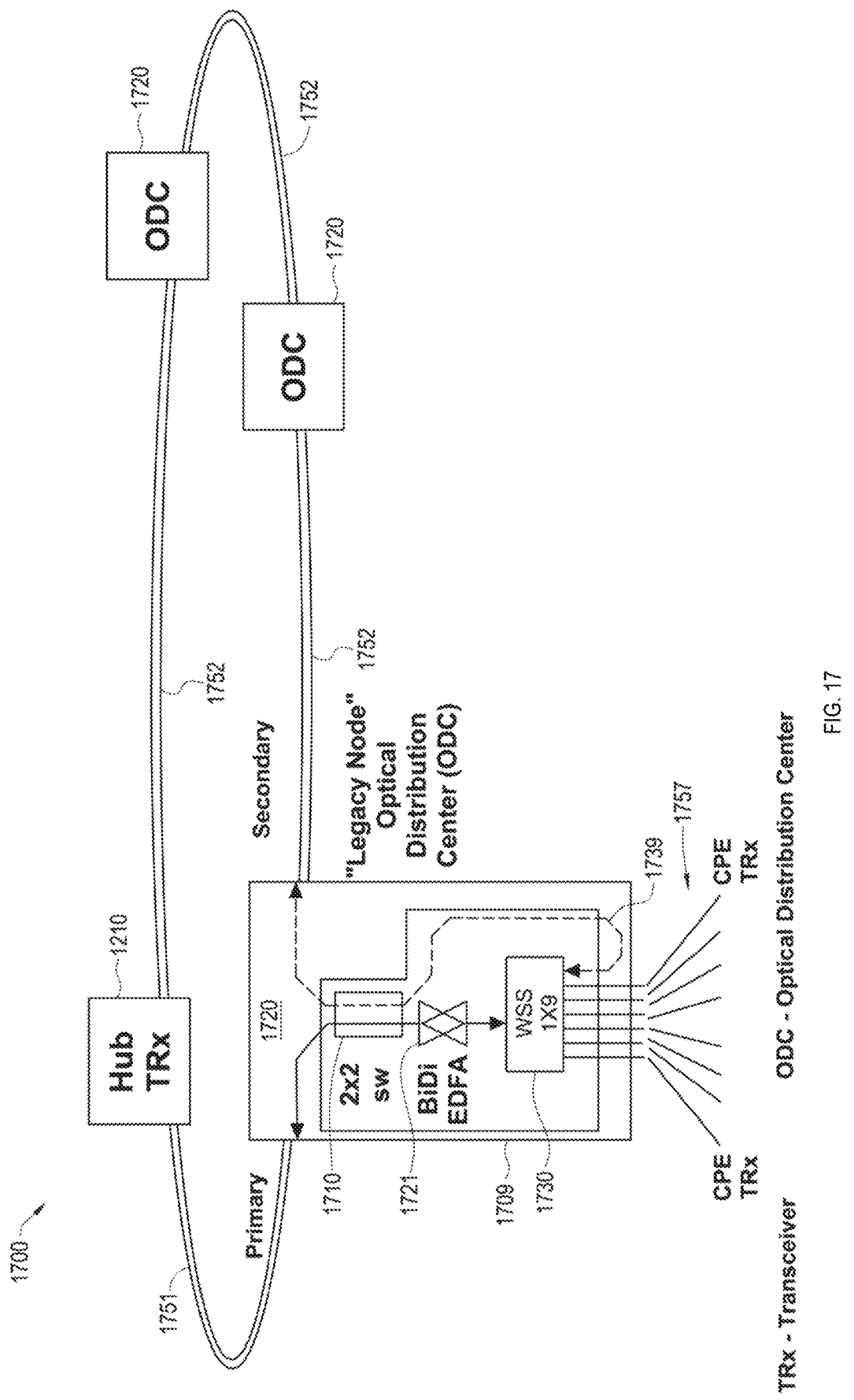
FIG. 17 is a schematic of an EWSS in optical access fiber ring, in an embodiment.

FIG. 17 is a schematic of an optical access ring 1700 that includes a primary optical fiber 1751, a secondary optical fiber 1752, multiple network nodes 1720 and a network hub 1210. Network node 1720 is an example of network node 1220, FIG. 12 and includes a respective EWSS 1709, which is an example of EWSS 1100, FIG. 11.

A first key characteristic of EWSS 1100 is that it is designed to handle full duplex optical transmissions. This mode of optical transmission is suitable for cable's optical access environment and has been described in U.S. Pat. No. 10,397,672, where only a single optical port is needed for each direction of transmission. In embodiments, such a transmission mode uses the same wavelength in each direction, e.g., down-link and up-link.

A second characteristic is that EWSS 1709 assume a complexity no higher than second degree ROADM. This ROADM complexity supports point-to-point, ring, or bus network topologies. EWSS 1709 includes a 2×2 optical switch 1710, a WSS 1730, and, in certain embodiments, a bidirectional optical amplifier 1721. Switch 1710, WSS 1730, and amplifier 1721 are examples of switch 1110, WSS 1130, and amplifier 1121, respectively. Optical switch 1710 is located on hub side (a.k.a. WAN side or ring side), and is connected to primary optical fiber 1751 and secondary optical fiber 1752, and on the local side connects to the bidirectional optical amplifier 1721 and to the bypass output port of WSS 1730.

Bidirectional optical amplifier 1721 connects to one port of the WSS 1730 that connects to bidirectional optical amplifier 1720 through its input port and connects to local tributary links 1757 for local service and to bypass link 1739 that loops back to optical switch 1710. Bypass link 1739 is an example of bypass link 1139, FIG. 11.

Even though WSS 1730 is being described as having a single input port and multiple output ports, each port is full-duplex, meaning optical signals can both enter and exit every port. Each port is full-duplex, true directionless. This is one key difference with other implementations, which require two fiber ports to support both signal directions. Every port can receive or transmit any wavelength, such that WSS 1730 is colorless. In embodiments, EWSS 1709 is not contentionless. Optical switch 1710 is responsible for significant simplification of the system and very fast failover recovery.

As shown in FIG. 17, EWSS 1709 requires only a single wavelength selective switch (WSS 1730) which result in a loss of about only 6 dB. This means that for sensitive coherent signals, no amplification is needed unless three or more edge-wavelength switching systems (such as EWSS 1100) are used in cascade. Therefore, when transporting coherent signals, only every other three legacy nodes need to include amplification. One optical path in WSS 1730 within EWSS 1709 carries the bypass traffic, and other optical paths are used for local tributary links 1757, which are connected to transceivers of local premise host equipment such as transceiver 1382 of premise host equipment 1380, FIG. 13. Each full duplex port handles upstream and downstream direction. Therefore, the full-duplex transport of EWSS 1709 may be leveraged such that and EWSS 1709 requires only half of the number of ports compared to traditional and metro optimized implementations.

Figure 18A:
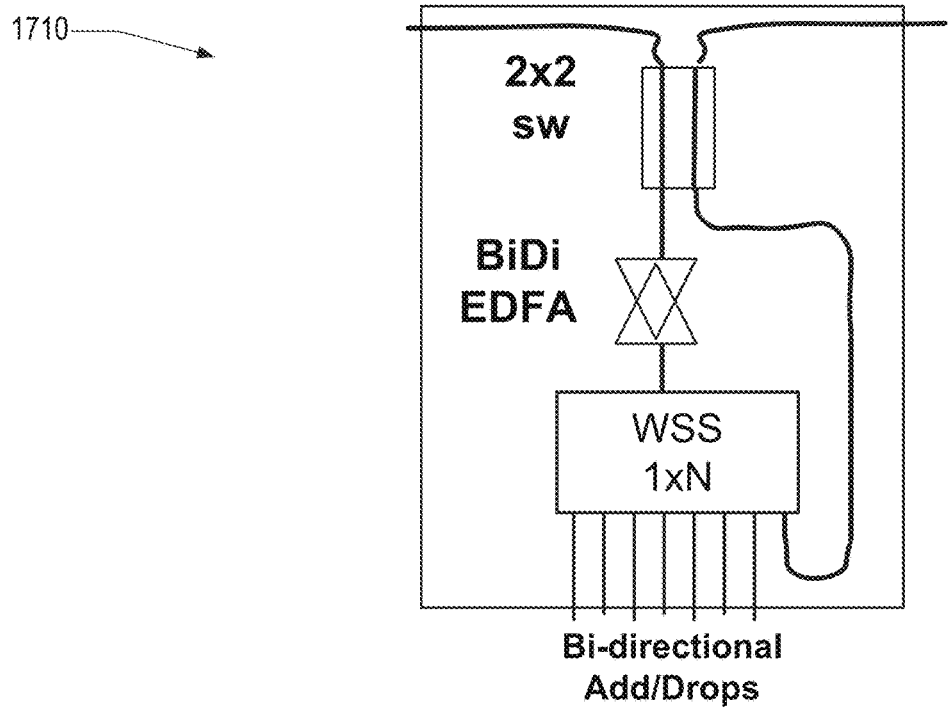
FIGS. 18A and 18B are a schematic of the EWSS of FIG. 11 operating in normal and failover modes respectively, in an embodiment.
Figure 18B:
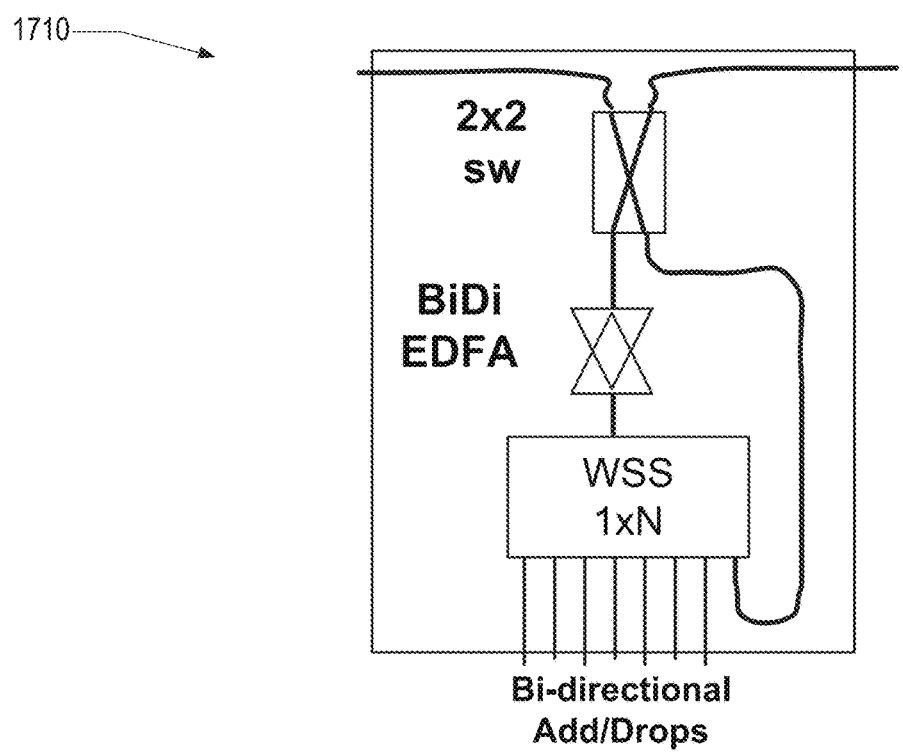

In a ring network topology, such as in optical network 1700, or at most a degree-2 ROADM functionality, when a fiber cut occurs in primary optical fiber 1751, secondary optical fiber 1752 is enabled by optical switch 1710 that faces the ring ports. In embodiments, parallel configuration of optical switch 1710 corresponds to normal figuration, as shown in FIG. 18A, and cross-configuration of optical switch 1710 corresponds to a failover mode, as illustrated in FIG. 18B. In embodiments, parallel configuration and cross-configuration of optical switch 1710 corresponds to failover mode and normal mode respectively. In either designation of normal and failover modes, the switching states of output ports of WSS 1730 within EWSS 1709 do not change. Only the set of bypass channels will change, but as disclosed herein, even the configuration of the bypass port of WSS 1730 need not change during failover.

Figure 19:
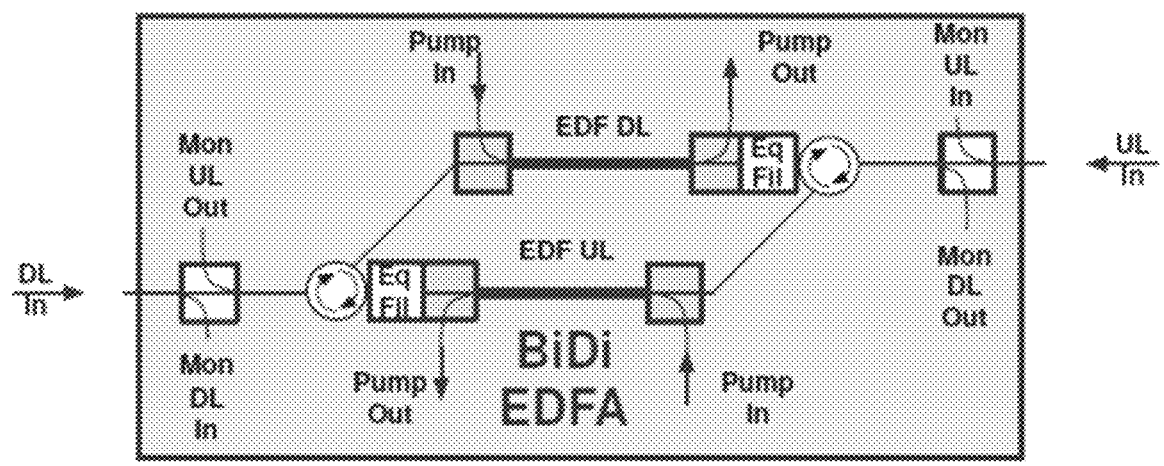
FIG. 19 is a schematic of an integrated bidirectional erbium-doped fiber amplifier (EDFA) of the EWSS of FIG. 11, in an embodiment.
Figure 20:
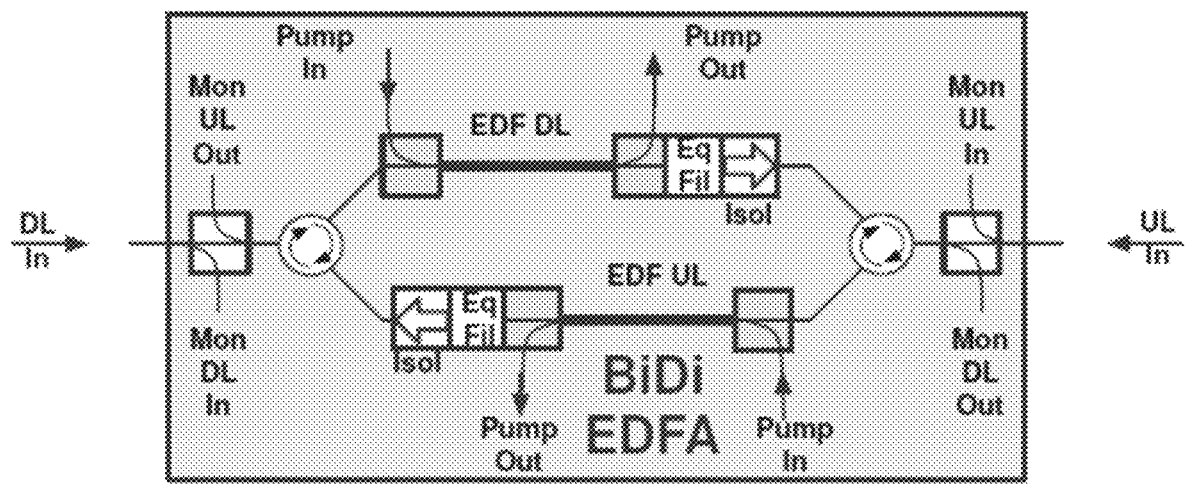
FIG. 20 is a schematic of a discrete bidirectional EDFA of the EWSS of FIG. 11, in an embodiment.

FIGS. 19 and 20 illustrate respective example implementations of amplifier 1721. FIG. 19 shows a bidirectional EDFA 1921 leveraging integration with circulators immediately following the equalization filters. FIG. 20 shows a bidirectional EDFA 2021 leveraging discrete components. EDFA 2021 incorporates isolators to prevent oscillations.

Figure 21:
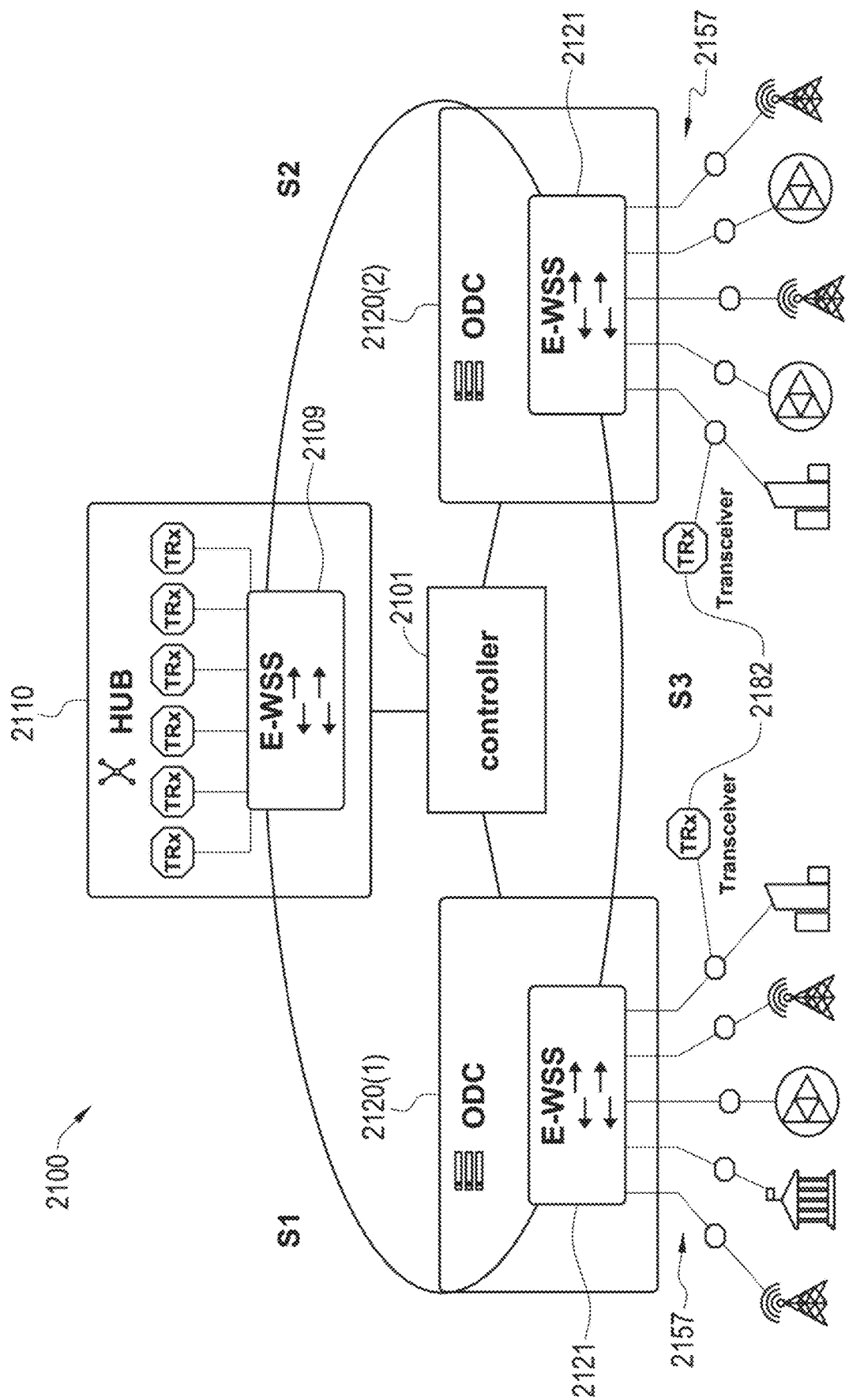
FIG. 21 is a schematic of a ring network, which is an example of the optical network of FIG. 12.

FIG. 21 is a schematic of a ring network 2100, which is an example of the optical network of FIG. 12. Ring network 2100 includes network nodes 2120(1,2) and a network hub 2110 communicatively coupled via a ring network topology. Network nodes 2120 and network hub 2110 are examples of network nodes 1220 and network hub 1210, respectively. Ring network includes a controller 2101 communicatively coupled network nodes 2120 and network hub 2110. Controller 2101 is an example of controller 1301, FIG. 13. Each network node 2120 includes a respective EWSS 2121, which is an example of EWSS 1100. Network hubs 1400 and 1500 are examples of network hub 2110.

Network nodes 2120 transmit and receive data from downlink transceivers 2182 via local tributary links 2157, which are examples of local tributary links 1757. At least one of transceivers 2182 corresponds to transceiver 1382, FIG. 13. In embodiments, controller 2101 constantly monitors transceivers 2182. Controller 2101 queries performance parameters from each of transceivers 2182 and based on this information, determines whether there is any action to be taken by any of the EWSSs of ring network 2100. For example, assume that the traffic paths originate at network hub 2110 and reach network nodes 2120 in counter-clockwise direction. This means that the traffic to network nodes 2120 run through fiber segment 1 (S1) and traffic that continues to network node 2120(2) also uses fiber segment 3 (S3). If fiber segment 1 (S1) would suffer a fiber cut, traffic from all transceivers will be routed through fiber segment 2 (S2) and the traffic that continues to network node 2120(1) also uses segment 3 (S3).

Controller 2101 enables loopbacks leveraging loopback at transceivers 2182 rather than at EWSS 2121. This simplifies the complexity of the optical interconnecting network within the WSS, and the cost of EWSS 2121. How much the controller 2101 does may vary. Some simple functions of detecting energy in certain parts of EWSS 2121 and network hub 2110, such as the segment between the bi-directional amplifier (when present) and the 2×2 switch thereof, could facilitate the speed for failover recovery.

Figure 22:
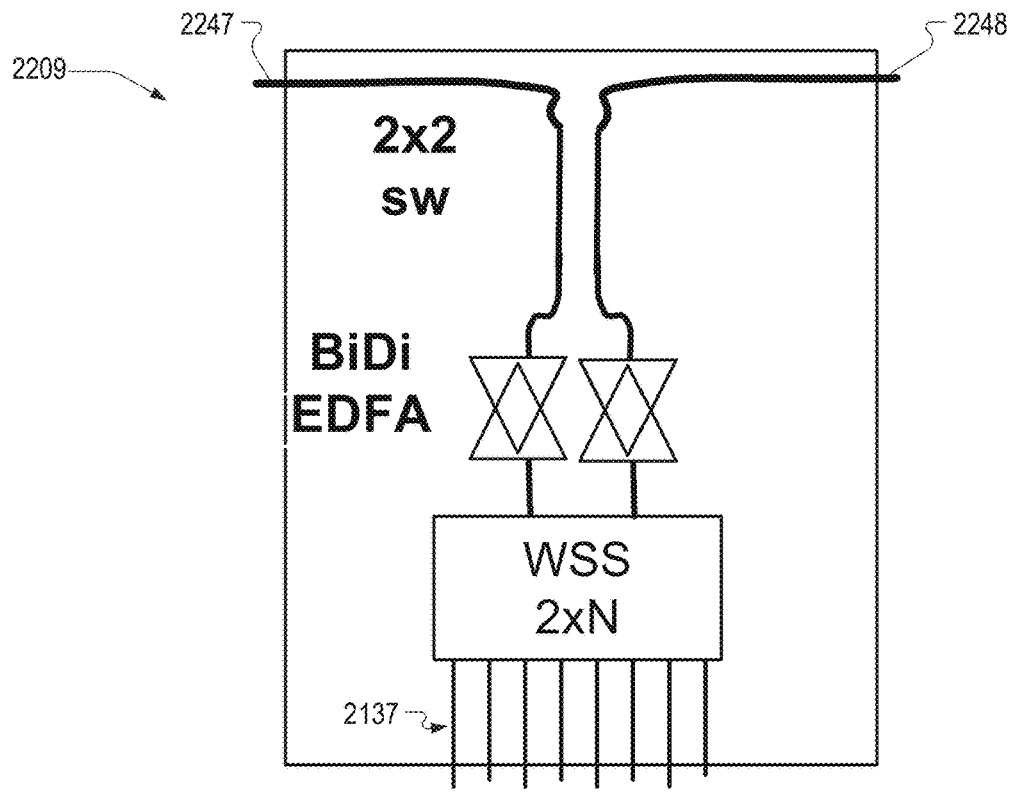
FIG. 22 is a schematic of a first example of an EWSS of the network hub of FIG. 12.
Figure 23:
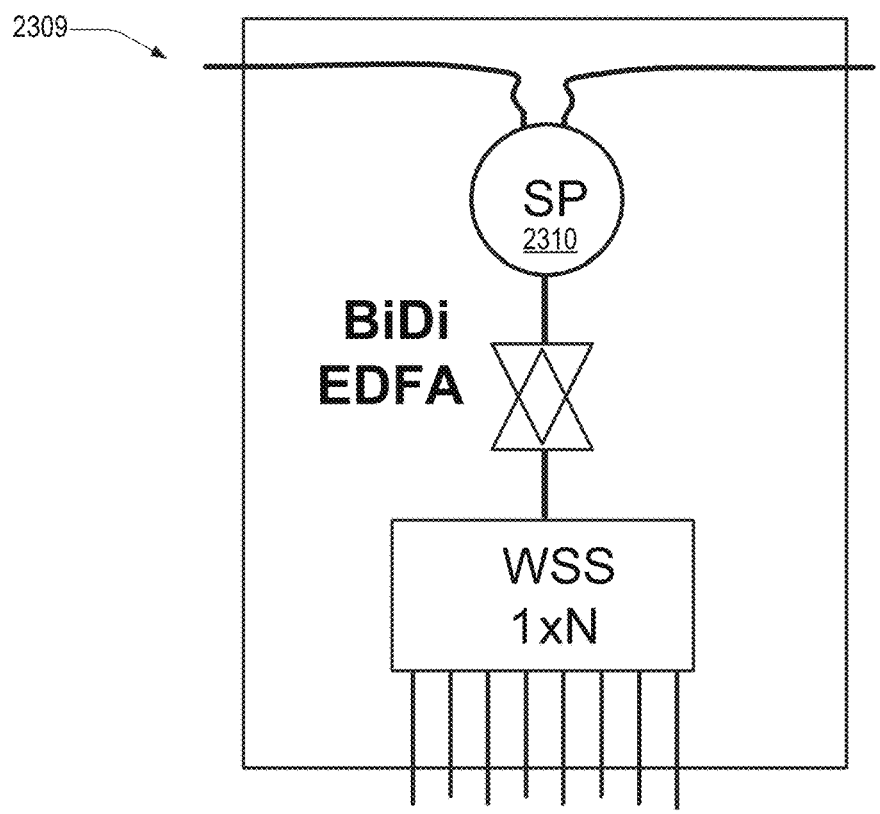
FIG. 23 is a schematic of a second example of an EWSS of the network hub of FIG. 12.

Network hub 2110 includes an EWSS 2109, of which EWSSs 1409 and 1509 are examples. FIGS. 22 and 23 depict EWSSs 2209 and 2309, which are also examples of EWSS 2109. EWSS 2209 includes two input ports 2247 and 2248 and multiple output ports 2137 (FIG. 22). This port configuration allows flexible configuration to which wavelength take the counter-clockwise path (from segment S1 to S3) and which wavelengths take the clockwise path (from segment S2 to S3) of ring network 2100. EWSS 2209 is similar to EWSS 1409.

FIG. 23 illustrates EWSS 2309, in which a two-way splitter 2310 broadcasts network traffic simultaneously in clockwise and counterclockwise directions in network 2100. EWSS 2309 is similar to EWSS 1509. While EWSS 2209 provides more efficient use of wavelengths within fiber, EWSS 2309 provides a simpler implementation and significantly faster response in failover recovery. No re-configuration at the hub EWSS is required; only configuration of the 2×2 switches at network nodes 2120 (EWSS 2121) is required.

Figure 24:
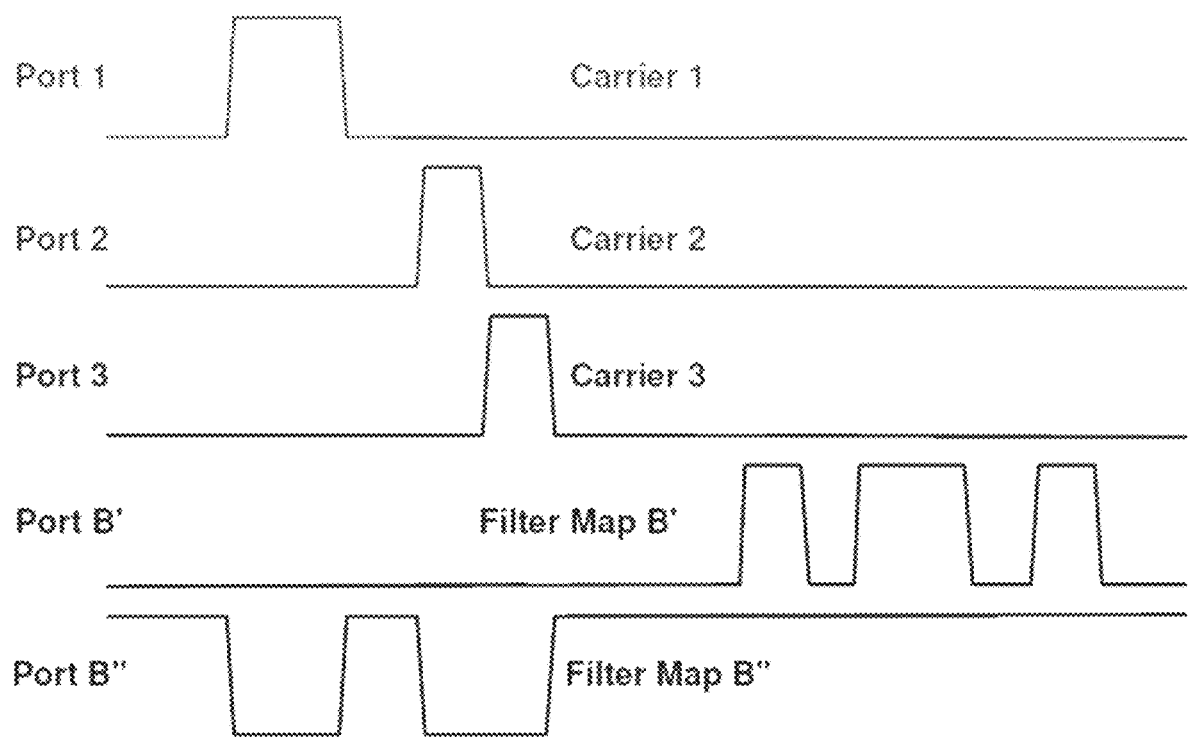
FIG. 24 is a schematic illustrating example filter maps employed by a wavelength-selective switch of the EWSS of FIG. 11, in an embodiment.

The two options for reconfiguration of EWSS 2121 at network nodes 2120 are as follows. In a first filter mapping, each of the drop wavelengths are individually configured to traverse to their intended output port and in the bypass output port all the wavelengths of each of the bypass channels are configured. The EWSS filter transmission configuration map corresponds to filter map B' in FIG. 24. The first filter mapping corresponds to filter map 1334, FIG. 13.

In a second filter mapping, all the drop wavelengths are individually configured to traverse to their intended output port and for the bypass output port a filter map command is generated such that the complement of the union of all the drop wavelengths is selected. In other words, the complement of the union of all drop wavelength are configured in the bypass port. This EWSS filter transmission configuration map corresponds to filter map B" in FIG. 24. The second filter mapping corresponds to filter map 1336, FIG. 13.

The first filter mapping combined with EWSS 2209 yields higher fiber spectrum efficiency than the second filter mapping combined with EWSS 2309. The second filter mapping combined with EWSS 2309 is a scenario that result in a faster failover and no WSS reconfiguration. It is also the case that is least impacted by cascading filters because they are only subjected to one filter at network node 2120.

Figure 25:
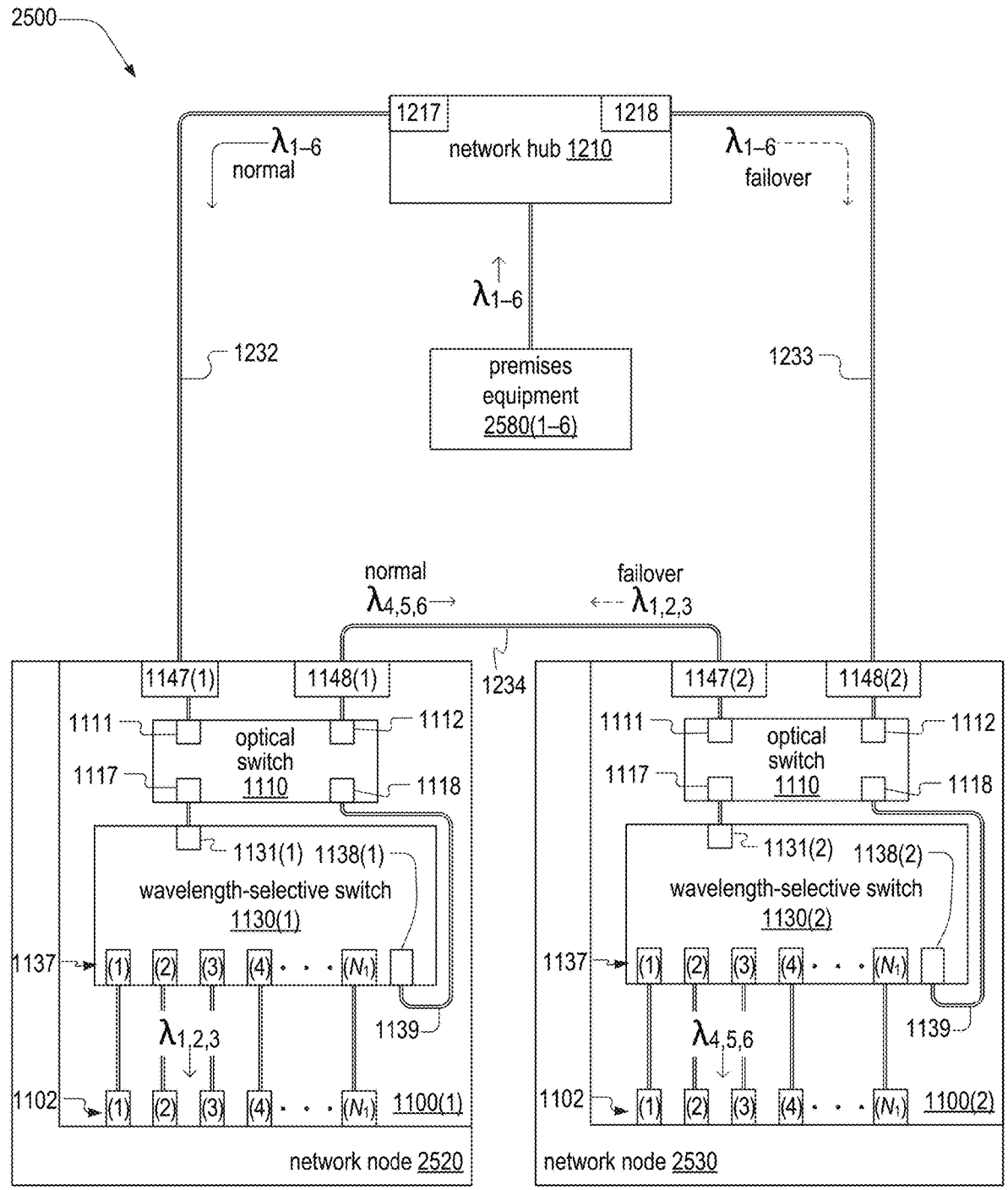
FIG. 25 is a schematic block diagram of an optical network, which is an example of the optical network of FIG. 12.

FIG. 25 is a schematic block diagram of an optical network 2500, which is an example of optical network 1200. Optical network 2500 includes network hub 1210, a network node 2520, a network node 2530, and communication links 1232-1234. Network nodes 2520 and 2530 are examples of network nodes 1220 and 1230 respectively, and include EWSS 1100(1) and EWSS 1100(2), respectively. Communication link 1232 optically couples west local-side port 1217 of network nub 1210 to hub-side I/O port 1147(1) of EWSS 1100(1). Communication link 1234 optically couples port 1148(1) of EWSS 1100(1) to hub-side I/O port 1147(2) of EWSS 1100(2). Communication link 1233 optically couples port 1148(2) of EWSS 1100(2) to east local-side port 1218 of network hub 1210.

Each of network hub 1210, node 2520, and node 2530 have respective filter maps that depend on whether any of communication links 1232-1234 are broken. The filter maps described herein are examples of filter maps generated by filter-map generator 1324, FIG. 13. In a normal state of network 2500, each of communication links 1232-1234 function properly, and network hub 1210, network node 2520, and network node 2530 operate according to a respective normal-state filter map.

Network hub 1210 operates according to a normal-state filter map that maps west local-side port 1217 to allow carrier wavelengths $\lambda_{1-6}$ and maps east local-side port 1218 to allow no carrier wavelengths. For example, network hub 1210 routes carrier wavelengths $\lambda_{1-6}$ received from premise host equipment 2580(1-6) connected thereto to west local-side port 1217, while routing no such carrier wavelengths to East local-side port 1218. Each CPE 2580 is an example of premise host equipment 1380

Network node 2520 operates according to a normal-state filter map in which (i) hub-side I/O port 1147(1) functions as a source port that allows any carrier wavelength, (ii) WSS 1130(1) routes carrier wavelengths $\lambda_{1,2,3}$ from multiplexed port 1131(1) to exit a respective local-side port 1137, (iii) WSS 1130(1) routes carrier wavelengths $\lambda_{4,5,6}$ from multiplexed port 1131(1) exit bypass port 1138 of WSS 1130(1), and (iv) hub-side I/O port 1148(1) functions as an exit port that allows, e.g., transmits, carrier wavelengths $\lambda_{4,5,6}$ to network node 2530 via communication link 1234. In embodiments, the normal-state filter map dictates that bypass port 1138(1) transmits only $\lambda_{4,5,6}$, as in filter map B' of FIG. 24. In embodiments, the normal-state filter map dictates that bypass port 1138(1) transmits all received carrier wavelengths other than $\lambda_{1,2,3}$, as in filter map B'' of FIG. 24.

Network node 2530 operates according to a normal-state filter map in which (i) hub-side I/O port 1147(2) functions as a source port that allows carrier wavelengths $\lambda_{4,5,6}$, which exit a respective local-side port 1137 of WSS 1130(2), and (ii) WSS 1130(2) routes carrier wavelengths other than $\lambda_{4,5,6}$ to bypass port 1138(2).

In a failover state of network 2500, each of communication links 1232-1234 function properly, and network hub 1210, network node 2520, and network node 2530 operate according to a respective failover-state filter map.

Network hub 1210 operates according to a failover-state filter map that maps east local-side port 1218 to allow carrier wavelengths $\lambda_{1-6}$ and maps west local-side port 1217 to allow no carrier wavelengths. For example, network hub 1210 routes carrier wavelengths $\lambda_{1-6}$ received from premise host equipment connected thereto, such as premise host equipment 1380, to east local-side port 1218, while routing no such carrier wavelengths to west local-side port 1217.

Network node 2530 operates according to a failover-state filter map in which (i) hub-side I/O port 1148(2) functions as a source port that allows any carrier wavelength, (ii) WSS 1130(2) routes carrier wavelengths $\lambda_{4,5,6}$ from multiplexed port 1131(2) to exit a respective local-side port 1137, (iii) WSS 1130(2) routes carrier wavelengths, other than carrier wavelengths $\lambda_{4,5,6}$, from multiplexed port 1131(2) to exit bypass port 1138(2), and (iv) hub-side I/O port 1147(2) functions as an exit port that allows, e.g., transmits, carrier wavelengths $\lambda_{1,2,3}$ to network node 2520 via communication link 1234. In embodiments, the failover-state filter map dictates that bypass port 1138(2) transmits only $\lambda_{1,2,3}$, as in filter map B' of FIG. 24. In embodiments, the normal-state filter map dictates that bypass port 1138(2) transmits all received wavelengths other than $\lambda_{4,5,6}$, as in filter map B'' of FIG. 24.

Network node 2520 operates according to a failover-state filter map in which (i) hub-side I/O port 1148(1) functions as a source port that allows carrier wavelengths $\lambda_{1,2,3}$, which exit a respective local-side port 1137 of WSS 1130(1), and (ii) WSS 1130(1) routes carrier wavelengths other than $\lambda_{1,2,3}$ to bypass port 1138(1).

Figure 26:
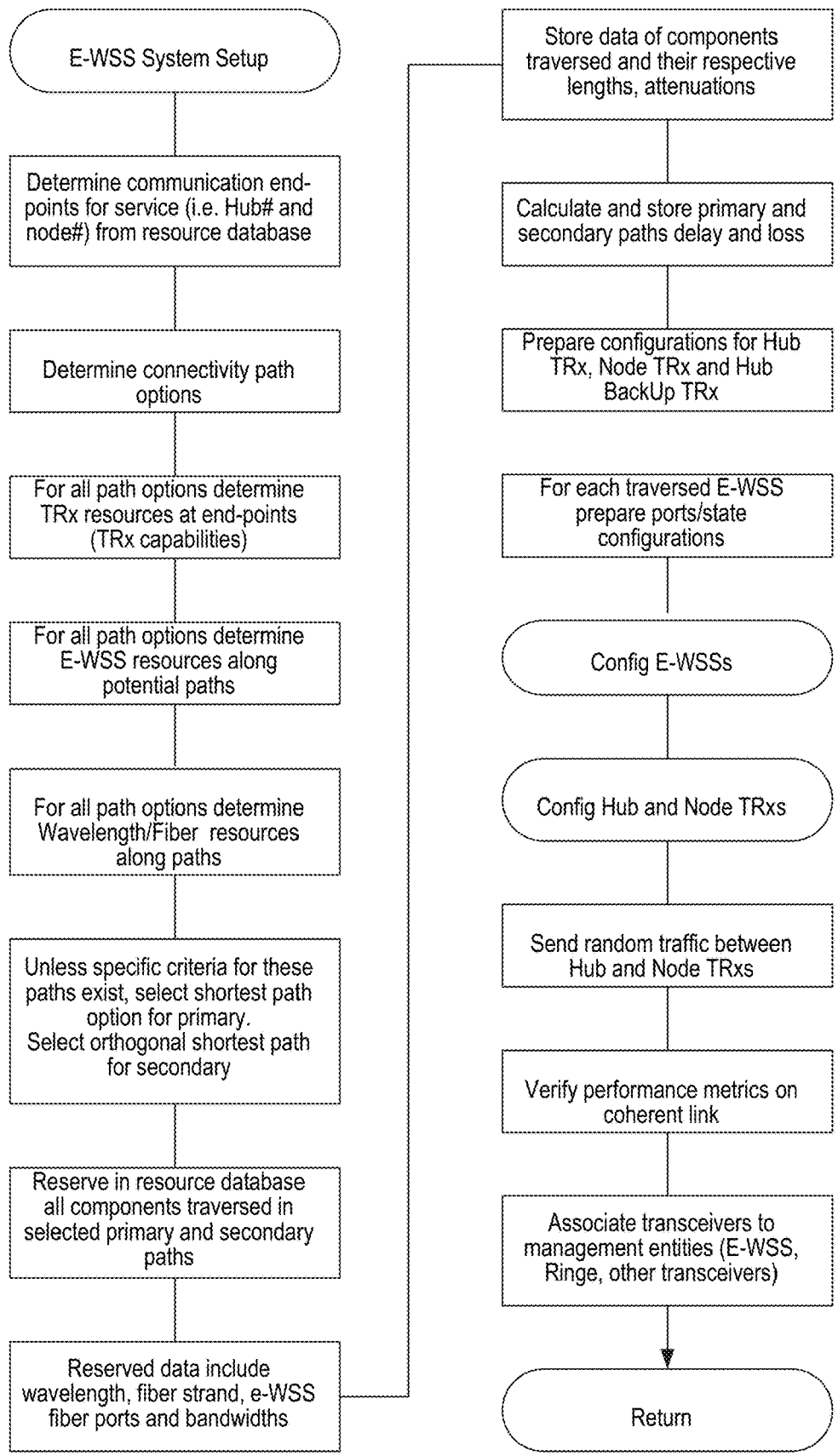
FIG. 26 is a flowchart illustrating a method for setting up the EWSS of FIG. 11, in an embodiment.
Figure 27:
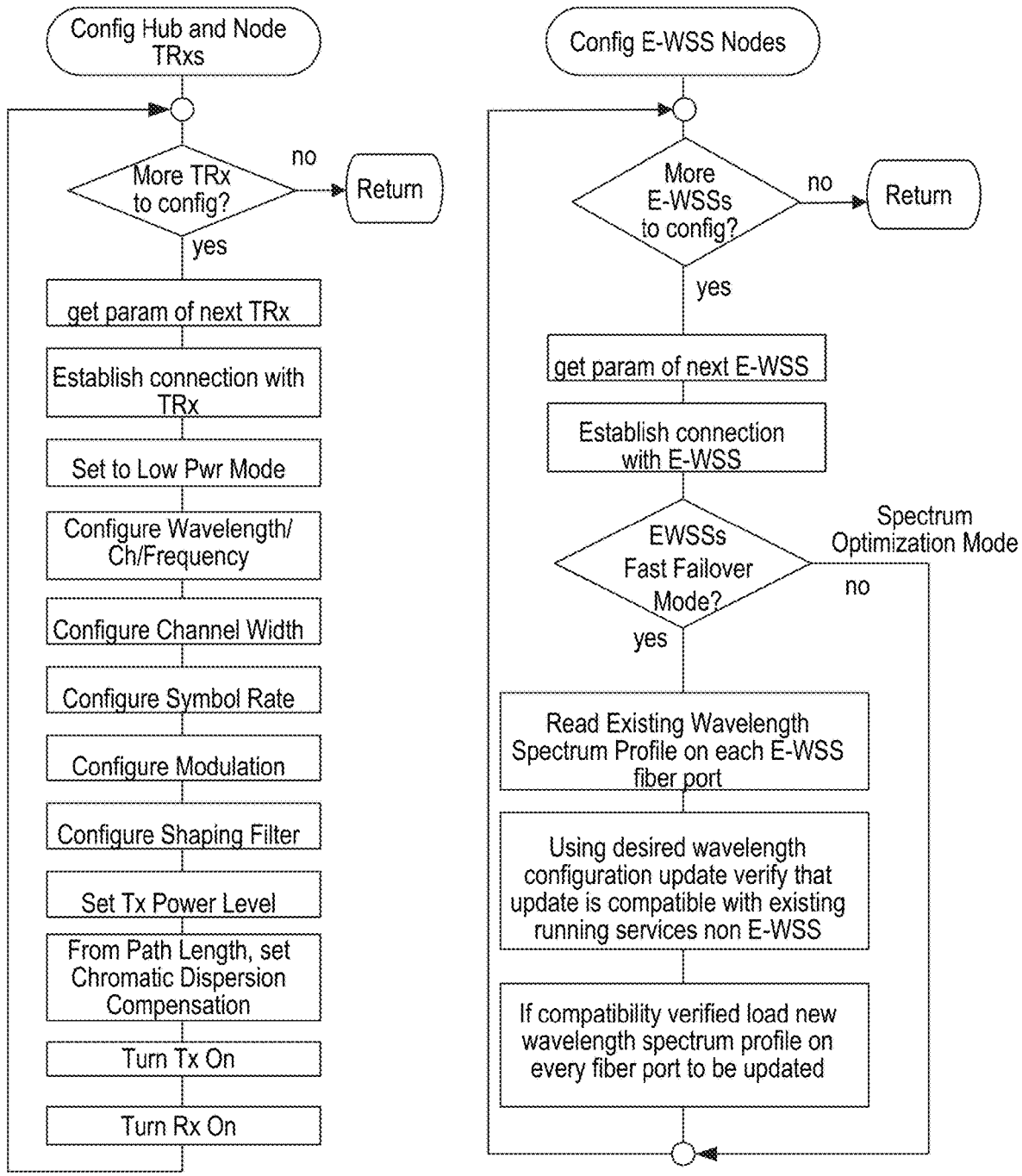
FIG. 27 includes flowcharts illustrating processes for configuring transceivers and the EWSS of FIG. 11, in an embodiment.
Figure 28:
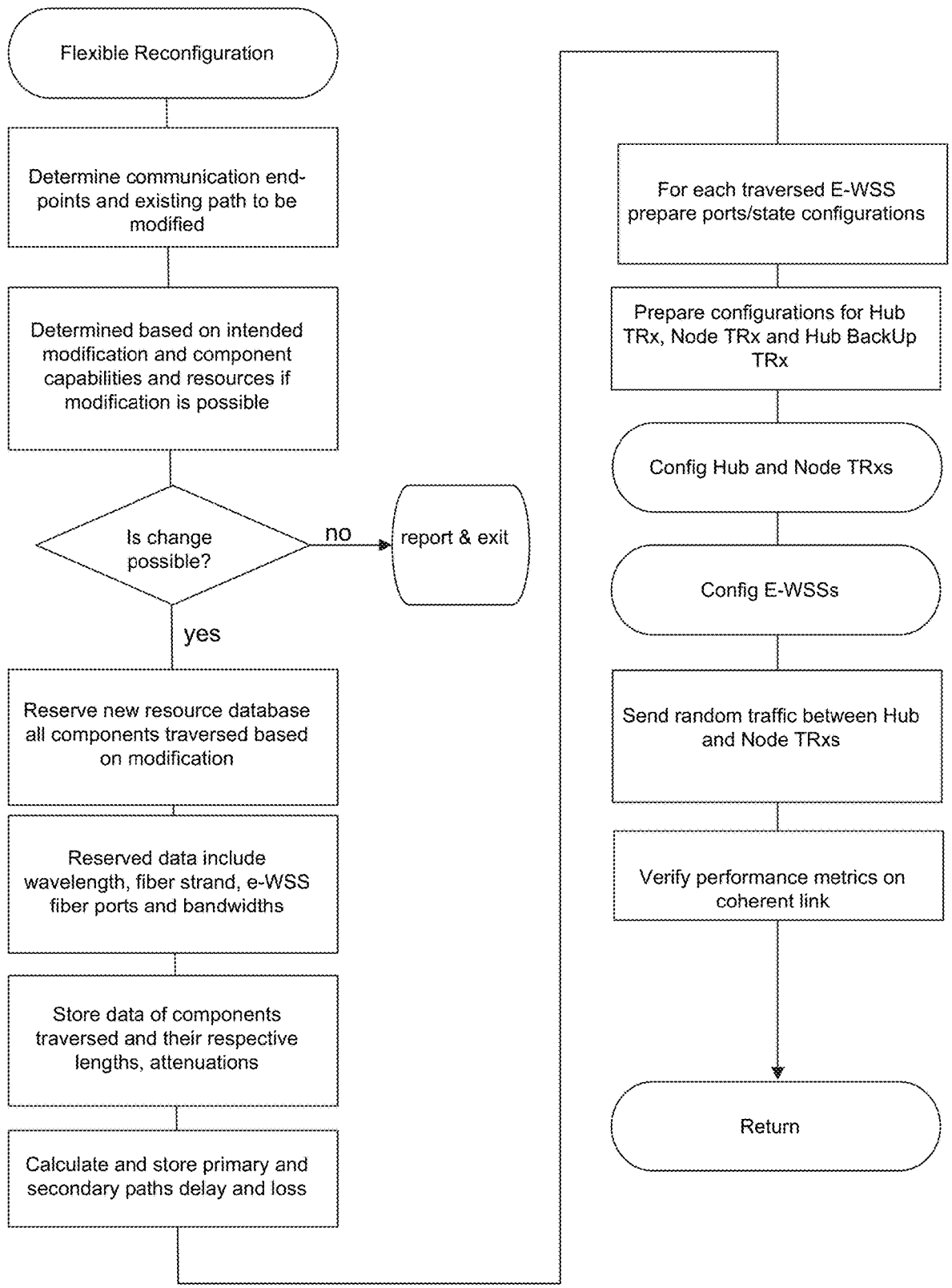
FIG. 28 is a flowchart illustrating a flexible configuration method for the EWSS of FIG. 11, in an embodiment.

Controller 1301, FIG. 13, enables wavelength management functions illustrated as process flowcharts in FIGS. 26-30. FIG. 26 is a flowchart illustrating a method for setting up EWSS 2121 and/or EWSS 2109. FIG. 27 includes flowcharts illustrating processes for configuring transceivers 2182 and the EWSS 2121. FIG. 28 is a flowchart illustrating flexible transmission reconfiguration for fast service provisioning (and on-demand services) for EWSS 2121 and/or EWSS 2109.

Figure 29:
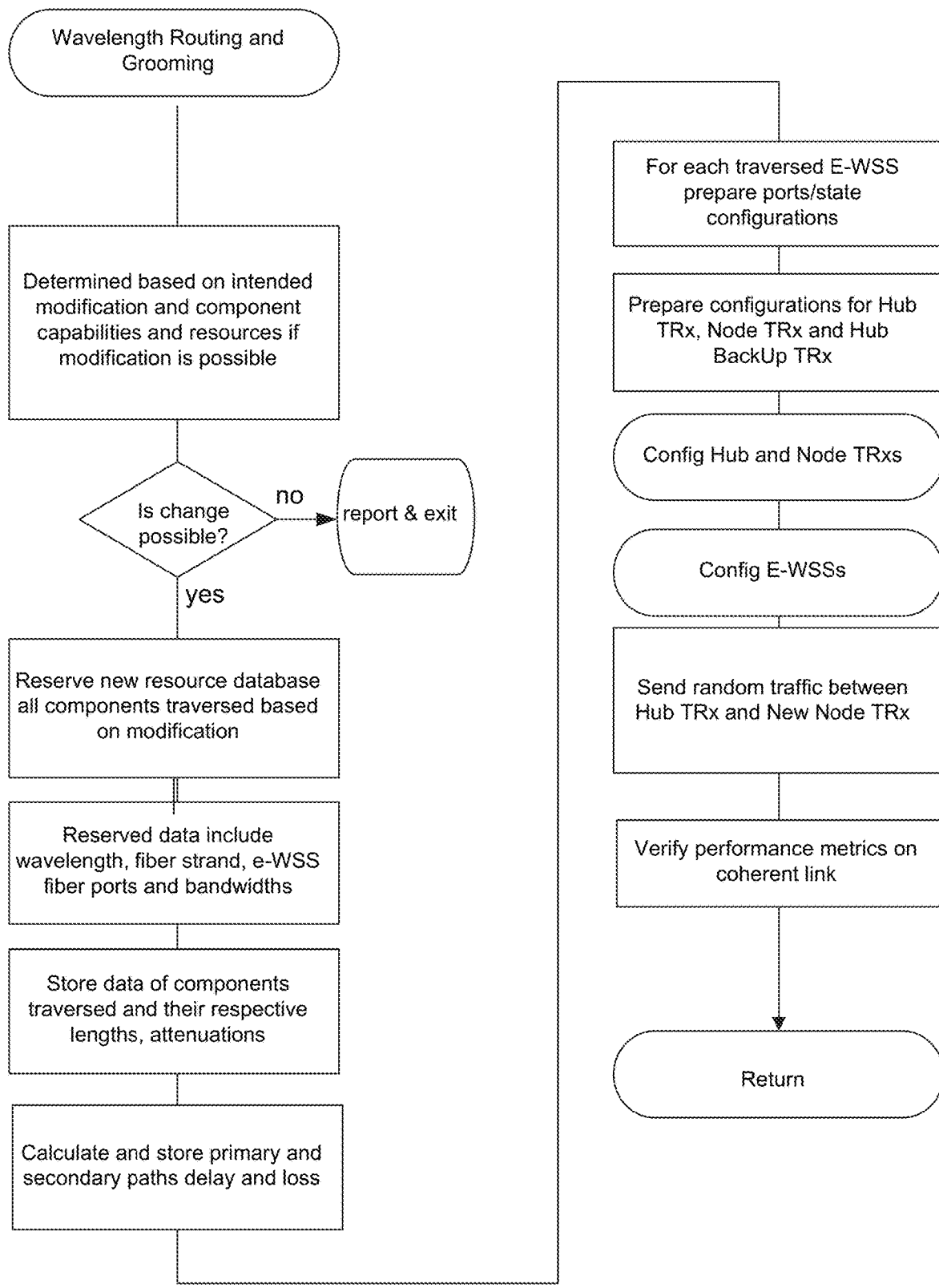
FIG. 29 is a flowchart illustrating of a method of wavelength routing using the EWSS of FIG. 11.
Figure 30:
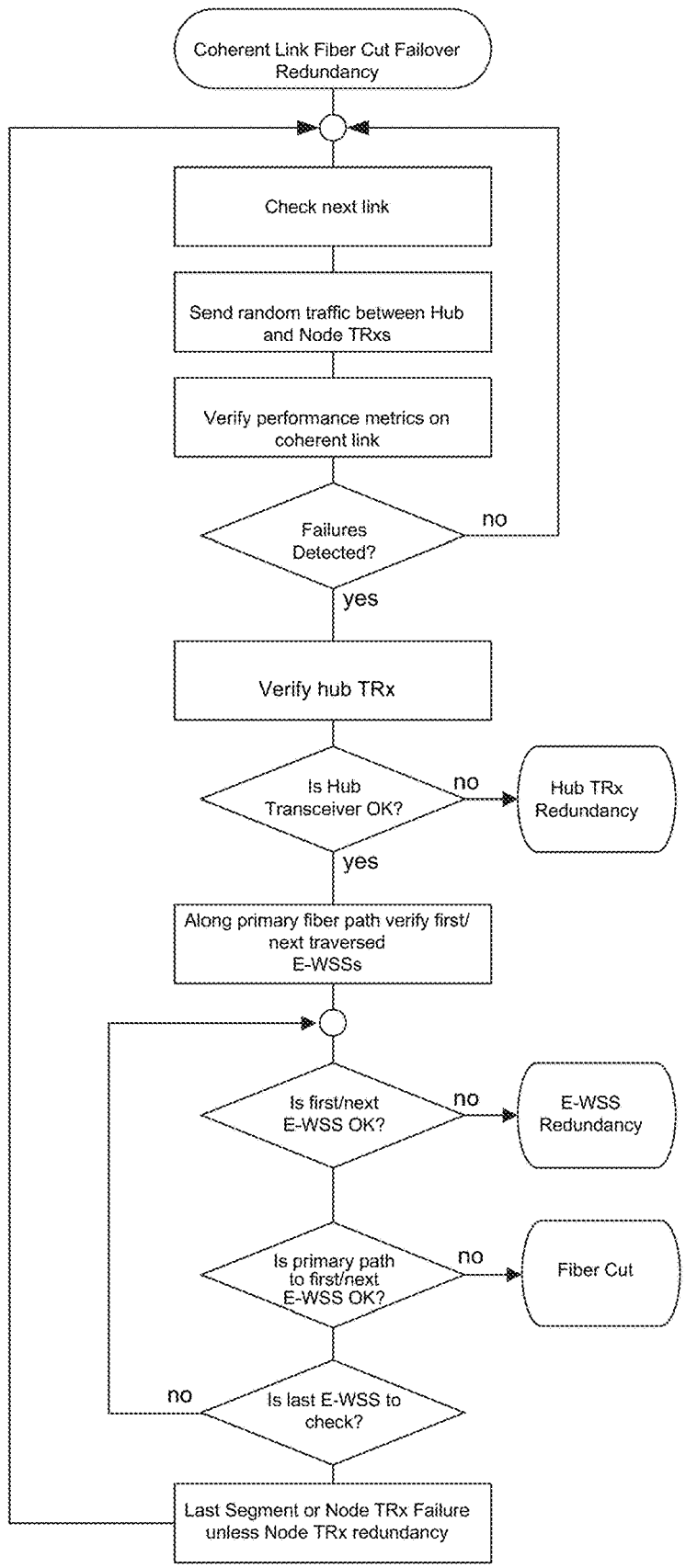
FIG. 30 is a flowchart illustrating of a failover recovery process using the EWSS of FIG. 11, in an embodiment.

FIG. 29 is a flowchart illustrating wavelength routing and grooming for reclaiming fiber resources and capacity optimization. FIG. 30 is a flowchart illustrating of a failover recovery process using EWSS 1100 of FIG. 11. It is implemented leveraging fiber failure detection through inference from transceiver information.

Combinations of Features

Features described above as well as those claimed below may be combined in various ways without departing from the scope hereof. The following enumerated examples illustrate some possible, non-limiting combinations.

(A1) An edge wavelength-switching system includes an optical switch and a wavelength selective switch. The optical switch includes a west hub-side port, an east hub-side port, a west local-side port, and an east local-side port. The wavelength selective switch includes (i) a multiplexed port optically coupled to the west local-side port and (ii) a bypass port optically coupled to the east local-side port, and (iii) a plurality of demultiplexed ports.

(A2) In any system (A1), the plurality of demultiplexed ports being $N_1$ in number, the west hub-side port, the east hub-side port, and $D_1$ of the plurality of demultiplexed ports may function as input/output ports of the system, wherein $D_1$ is less than or equal to $N_1$, and a total number of the plurality of input/output ports equaling ($D_1$+2).

(A3) In any of systems (A1) and (A2), the plurality of demultiplexed ports being $N_1$ in number, the west hub-side port, the east hub-side port, and $D_1$ of the plurality of demultiplexed ports may function as a plurality of input/output ports of the system, wherein $D_1$ is less than or equal to $N_1$. The system may lack a coherent receiver between any two input/output ports of the plurality of input/output ports.

(A4) Any of systems (A1) through (A3) may further include a bidirectional optical amplifier optically coupling the west local-side port to the multiplexed port.

(A5) In any of systems (A1) through (A4), the optical switch may be configured to operate in both (i) a parallel mode, in which the west and east hub-side ports are optically coupled to the west and east local-side ports respectively, and (ii) a crossed mode, in which the west and east hub-side ports are optically coupled to the east and west local-side ports respectively.

(A6) In any of systems (A1) through (A5), the edge wavelength-switching system may lack any additional wavelength selective switches other than the wavelength selective switch.

(A7) In any of systems (A1) through (A6), the wavelength selective switch may further include a switching mechanism configured to route an optical signal entering wavelength selective switch via the multiplexed port to any of the plurality of demultiplexed ports according to a center wavelength of the optical signal. The switching mechanism includes at least one of (i) microelectromechanical mirrors, (ii) a liquid-crystal polarizer, (iii) a liquid-crystal-on-silicon beam steerer, and (iv) tunable optical resonators.

(B1) An optical network includes a network hub including an M-by-$N_1$ wavelength-selective switch, $N_1$>M≥1, a first network node including any of systems (A1) through (A7), and a second network node including any of systems (A1) through (A7). The network hub, the first network node, and the second network node are optically coupled.

(B2) When the first network node is optically coupled, via a demultiplexed port of its plurality of demultiplexed ports, to premise host equipment that includes a transceiver, the optical network (B1) may further include a processor and a memory. The processor is communicatively coupled to the first network node. The memory is memory configured to store (i) a temporal sequence of bit-error rates received from the transceiver and (ii) non-transitory computer-readable failover instructions that, when executed by the processor, control the processor to: determine a bit-error-rate severity from the temporal sequence of bit-error rates; and control the optical switch of the first network node to switch from normal mode to failover mode when the bit-error-rate severity exceeds a predetermined severity threshold.

(B3) In any optical network (B2), the network hub may include an optical switch and a 2-by-$N_3$ wavelength selective switch. The optical switch includes a hub-side port A, a hub-side port B, a local-side port A, and a local-side port B. The 2-by-$N_3$ wavelength selective switch includes (i) a first multiplexed port optically coupled to the hub-side port A, (ii) a second multiplexed port optically coupled to the hub-side port B, and (iii) $N_3$ demultiplexed ports, and (iv) a switching mechanism configured to optically couple to any of the $N_3$ demultiplexed ports to either the first or the second multiplexed port, $N_3 > 2$.

(B4) In any optical network (B3), the memory may further include a frequency map that includes a plurality of frequency sub-bands each designated as one of a drop sub-band and a bypass sub-band. The memory may also include non-transitory computer-readable wavelength-routing instructions that, when executed by the processor, control the first network node to route each of the bypass sub-bands to the bypass port of the wavelength selective switch of the first network node.

(B5) Any of optical network (B3) and (B4) may further include a first bidirectional optical amplifier optically coupling the first multiplexed port to the hub-side port A; and a second bidirectional optical amplifier optically coupling the second multiplexed port to the hub-side port B.

(B6) In any optical network (B2), the network hub may include a fiber-optic splitter including a hub-side splitter-port, a first local-side splitter-port, and a second local-side splitter-port. The network hub may also include a 1-by-$N_3$ wavelength selective switch including (i) a first multiplexed port optically coupled to the hub-side splitter-port, (ii) $N_3$ demultiplexed ports, and (iii) a means to optically couple to any of the $N_3$ demultiplexed ports to the first multiplexed port, $N_3 > 1$.

(B7) In any optical network (B6), the memory may further include a frequency map that includes a plurality of frequency sub-bands spanning a frequency range and each designated as one of a drop sub-band and a bypass sub-band. The memory may also include non-transitory computer-readable wavelength-routing instructions that, when executed by the processor, control the first network node route bypass frequencies to the bypass port of the wavelength selective switch of the first network node, bypass frequencies including all frequencies within the frequency range and not part of a drop sub-band.

(B8) In any optical network (B1)-(B7), the network hub, the first network node, and the second network node being optically coupled via one of a ring topology and a bus topology.

(B9) When the network hub includes a hub-output port and a hub-input port, the optical switch of the first network node includes a first west hub-side port and a first east hub-side port, the optical switch of the second network node includes a second west hub-side port and a second east hub-side port, any optical network (B1)-(B8) may further include: a first optical fiber segment optically coupling the first west hub-side port to the hub-output port; a second optical fiber segment optically coupling the first east hub-side port to the second west hub-side port; and a third optical fiber segment optically coupling the second east hub-side port to the hub-output port.

(C1) A failover recovery method for an optical network includes determining a bit-error-rate severity from a temporal sequence of bit-error rates generated at premise host equipment optically coupled to a network node, of the optical network, that is optically coupled to a hub of the optical network via first optical-fiber path. The method also includes, when the bit-error-rate severity exceeds a predetermined value, rerouting optical signals transmitted between the premise host equipment and the hub such that the optical signals travel along a second optical-fiber path differing from the first optical-fiber path.

(C2) Any method (C1) may further include transmitting a random bit stream from a second premise host equipment to a transceiver of the first premise host equipment via a hub of the optical network and the network node; and generating, at the first premise host equipment, the temporal sequence of bit-error rates from the random bit stream.

(C3) In any of methods (C1) and (C2), rerouting optical signals may include controlling an optical switch of the network node to switch from normal mode to failover mode.

(C4) Any of methods (C1)-(C3) may further include determining the bit-error-rate severity by computing a number of consecutive bit-error rates of the temporal sequence of bit-error rates that exceeds a predetermined threshold bit-error-rate value.

What is claimed is:

1. An edge wavelength-switching system comprising:
   an optical switch including a west hub-side port, an east hub-side port, a west local-side port, and an east local-side port; and
   a wavelength selective switch including
   (i) a multiplexed port optically coupled to the west local-side port,
   (ii) a bypass port optically coupled to the east local-side port,
   (iii) a plurality of demultiplexed ports being $N_1$ in number where $N_1$ is at least three, and
   (iv) a switching mechanism that includes tunable optical resonators.

2. The system of claim 1,
   the west hub-side port, the east hub-side port, and $D_1$ of the plurality of demultiplexed ports functioning as a plurality of input/output ports of the system, wherein $D_1$ is less than or equal to $N_1$, and a total number of the plurality of input/output ports equaling ($D_1$+2).

3. The system of claim 1,
   the west hub-side port, the east hub-side port, and $D_1$ of the plurality of demultiplexed ports functioning as a plurality of input/output ports of the system, wherein $D_1$ is less than or equal to $N_1$;
   the system lacking a receiver between any two input/output ports of the plurality of input/output ports.

4. The system of claim 1, further comprising:
   a bidirectional optical amplifier optically coupling the west local-side port to the multiplexed port.

5. The system of claim 1, the optical switch being configured to operate in both (i) a parallel mode, in which the west and east hub-side ports are optically coupled to the west and east local-side ports respectively, and (ii) a crossed mode, in which the west and east hub-side ports are optically coupled to the east and west local-side ports respectively.

6. The system of claim 1, the edge wavelength-switching system lacking any additional wavelength selective switches other than the wavelength selective switch.

7. The system of claim 1,
   the switching mechanism being configured to route a channel of a multi-channel optical signal entering the wavelength selective switch, via the multiplexed port, to one of the plurality of demultiplexed ports according to a center wavelength of the channel.

8. An optical network comprising:
   a network hub including an M-by-$N_1$ wavelength-selective switch, $N_1 > M \geq 1$;

a first network node including a first instance of the edge wavelength-switching system of claim 1; and a second network node including a second instance of the edge wavelength-switching system of claim 1;

the network hub, the first network node, and the second network node being optically coupled.

9. The optical network of claim 8, further comprising a coherent transceiver optically coupled to the network hub.

\* \* \* \* \*